US012755510B2

(12) United States Patent
Sorakado et al.

(10) Patent No.: US 12,755,510 B2
(45) Date of Patent: Oct. 6, 2026

(54) LEARNING APPARATUS, INFERENCE APPARATUS, INFERENCE SYSTEM, LEARNING METHOD, INFERENCE METHOD, AND NON-TRANSITORY COMPUTER-READABLE STORAGE MEDIUM

(71) Applicant: CANON KABUSHIKI KAISHA, Tokyo (JP)

(72) Inventors: Hideki Sorakado, Tokyo (JP); Koichiro Nakamura, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 352 days.

(21) Appl. No.: 18/490,850

(22) Filed: Oct. 20, 2023

(65) Prior Publication Data

US 2024/0144646 A1 May 2, 2024

(30) Foreign Application Priority Data

Oct. 31, 2022 (JP) ................................ 2022-175029

(51) Int. Cl.
*G06V 10/74* (2022.01)
*G06T 7/00* (2017.01)
(Continued)

(52) U.S. Cl.
CPC .......... *G06V 10/761* (2022.01); *G06T 7/0002* (2013.01); *G06V 10/7715* (2022.01);
(Continued)

(58) Field of Classification Search
CPC ............ G06V 10/761; G06V 10/7715; G06V 10/776; G06V 40/171; G06V 10/94;
(Continued)

(56) References Cited

U.S. PATENT DOCUMENTS

| | | | |
|---|---|---|---|
| 8,929,595 B2 * | 1/2015 | Suzuki ................. | G06V 10/772 382/103 |
| 9,582,518 B2 | 2/2017 | Shiiyama | |

(Continued)

FOREIGN PATENT DOCUMENTS

| | | |
|---|---|---|
| JP | 2020-504891 A | 2/2020 |
| JP | 2021077377 A | 5/2021 |
| WO | 2018/124918 A1 | 7/2018 |

OTHER PUBLICATIONS

Dosovitskiy, A. et al., "An image is worth 16x16 words: Transformers for image recognition at scale" In ICLR, arXiv:2010.11929v2 (Jun. 2021) pp. 1-22.

(Continued)

*Primary Examiner* — Gregory A Morse
*Assistant Examiner* — Ronde Lee Miller
(74) *Attorney, Agent, or Firm* — Carter, DeLuca & Farrell LLP

(57) ABSTRACT

An apparatus calculates a positive pair similarity between a first feature vector of an image and a second feature vector associated with the same label as a label of the image, calculates a negative pair similarity between the first feature vector and a third feature vector associated with a label different from the label of the image, calculates a loss value with respect to the positive pair similarity lower than a threshold, calculates a loss value with respect to the negative pair similarity higher than the threshold, and learns a parameter of an feature extractor that decreases the loss values. For calculation one of the loss values, a loss function including a function such that an absolute value of a gradient is larger near a predetermined threshold and is non-zero but smaller even at a point away from the threshold is used.

14 Claims, 9 Drawing Sheets

(51) Int. Cl.

| | |
|---|---|
| ***G06V 10/77*** | (2022.01) |
| ***G06V 10/776*** | (2022.01) |
| ***G06V 10/82*** | (2022.01) |
| ***G06V 10/94*** | (2022.01) |
| ***G06V 40/16*** | (2022.01) |

(52) U.S. Cl.

CPC .......... *G06V 10/776* (2022.01); *G06V 40/171* (2022.01); *G06T 2207/20081* (2013.01); *G06T 2207/20084* (2013.01); *G06T 2207/30168* (2013.01); *G06T 2207/30201* (2013.01); *G06V 10/94* (2022.01)

(58) Field of Classification Search

CPC .... G06V 10/82; G06V 40/172; G06T 7/0002; G06T 2207/20081; G06T 2207/20084; G06T 2207/30168; G06T 2207/30201

See application file for complete search history.

(56) References Cited

U.S. PATENT DOCUMENTS

| | | | | |
|---|---|---|---|---|
| 9,594,981 | B2 | 3/2017 | Sorakado | |
| 9,916,521 | B2 * | 3/2018 | Matsushita | G06F 18/22 |
| 10,055,822 | B2 * | 8/2018 | Matsushita | G06T 5/73 |
| 10,147,018 | B2 | 12/2018 | Shiiyama | |
| 10,902,244 | B2 * | 1/2021 | An | G06F 18/2414 |
| 12,260,492 | B2 * | 3/2025 | Wang | G06T 19/20 |
| 2017/0116714 | A1 * | 4/2017 | Matsushita | H04N 23/88 |
| 2017/0132493 | A1 * | 5/2017 | Shiiyama | G06V 10/757 |
| 2017/0270422 | A1 * | 9/2017 | Sorakado | G06N 7/01 |
| 2022/0044004 | A1 * | 2/2022 | Zeng | G06V 40/171 |
| 2022/0100988 | A1 * | 3/2022 | Yamamoto | G06N 3/09 |
| 2022/0121884 | A1 * | 4/2022 | Zadeh | G06N 3/006 |
| 2022/0207260 | A1 * | 6/2022 | Dong | G06V 10/82 |
| 2023/0029988 | A1 * | 2/2023 | Yoshida | G06V 40/172 |
| 2023/0067730 | A1 * | 3/2023 | Nakamura | G06V 40/172 |
| 2023/0245421 | A1 * | 8/2023 | Zhang | G06V 40/172 382/118 |
| 2024/0005644 | A1 * | 1/2024 | Nakamura | G06V 10/774 |
| 2024/0169202 | A1 * | 5/2024 | Sorakado | G06N 3/045 |
| 2024/0242476 | A1 * | 7/2024 | Matsushita | G06V 10/62 |
| 2025/0316106 | A1 * | 10/2025 | Sureka | G06F 21/602 |
| 2026/0134714 | A1 * | 5/2026 | Turgeman | G06V 40/45 |

OTHER PUBLICATIONS

Schroff, F. et al., "Facenet: A unified embedding for face recognition and clustering" In CVPR, arXiv:1503.03832v3 (Jun. 2015), pp. 1-10.

Deng, J. et al., "ArcFace: Additive angular margin loss for deep face recognition" In CVPR, arXiv:1801.07698v2 (Nov. 2018) pp. 1-10.

Liu, J. et al., "AnchorFace: Boosting TAR@FAR for Practical Face Recognition" AAAI-22 (Jun. 2022) pp. 1711-1719, vol. 26, No. 2.

He, K. et al., "Identity mappings in deep residual networks" In ECCV, arXiv:1603.05027v3 (Jul. 2016) pp. 1-15.

Notice of Reasons for Refusal issued by the Japanese Patent Office on Jul. 13, 2026 in corresponding JP Patent Application No. 2022-175029, with English translation.

* cited by examiner

F I G. 5B

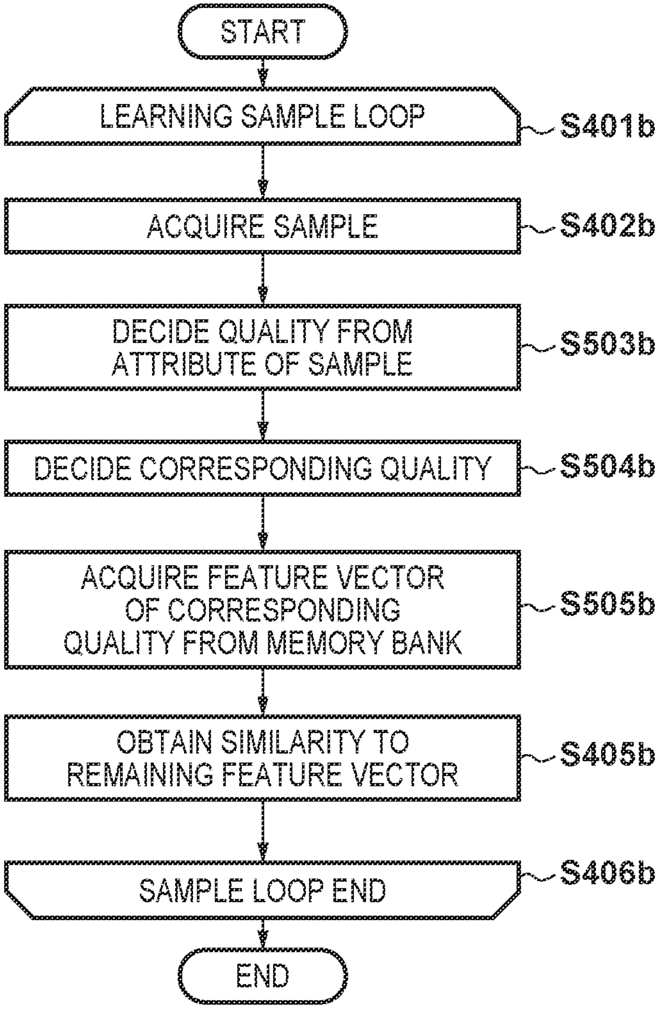

F I G. 5C

| CLASSIFICATION | TYPE OF ATTRIBUTE | HIGH QUALITY | LOW QUALITY |
|---|---|---|---|
| SHIELDING ATTRIBUTE | MASK | NONE | PRESENT |
| | SUNGLASSES | NONE | PRESENT |
| | HAT | NONE | PRESENT |
| | COSMETIC | NORMAL | ABNORMALITY |
| | SHIELDING | LESS THAN 5% | EQUAL TO OR LARGER THAN 5% |
| REFLECTION ATTRIBUTE | FACE SIZE | 100pixels OR MORE | LESS THAN 100pixels |
| | EYE WIDTH | 50pixels OR MORE | LESS THAN 50pixels |
| | EYE CLOSING | NONE | PRESENT |
| | FACIAL EXPRESSION | NONE | PRESENT |
| | FACE DIRECTION | LESS THAN ±5 DEGREES | ±5 DEGREES OR MORE |
| IMAGE QUALITY ATTRIBUTE | BRIGHTNESS | BRIGHT | DARK |
| | IMAGE CAPTURING DEVICE | SINGLE-LENS CAMERA | OTHER SINGLE-LENS CAMERA |
| | NOISE | NO BLURRING/ SHAKING | THERE IS BLURRING/ SHAKING |

LEARNING APPARATUS, INFERENCE APPARATUS, INFERENCE SYSTEM, LEARNING METHOD, INFERENCE METHOD, AND NON-TRANSITORY COMPUTER-READABLE STORAGE MEDIUM

BACKGROUND OF THE INVENTION

Field of the Invention

The present invention relates to a technique associated with authentication using an image.

Description of the Related Art

Conventionally, as a learning method of an authentication technique using an image, there is provided a method that uses the similarity of a pair (Japanese Patent Laid-Open No. 2020-504891). Furthermore, to improve accuracy in a predetermined erroneous determination level, there is provided a learning method of improving the accuracy by focusing on a pair near a determination threshold (J. Liu, H. Qin, Y. Wu, and D. Liang, "AnchorFace: Boosting TAR@FAR for Practical Face Recognition", AAAI, vol. 36, no. 2, pp. 1711-1719, June 2022).

However, in the technique described in Japanese Patent Laid-Open No. 2020-504891, there is a problem that a pair is used for learning regardless of the similarity of the pair. Furthermore, in the technique described in J. Liu, H. Qin, Y. Wu, and D. Liang, "AnchorFace: Boosting TAR@FAR for Practical Face Recognition", AAAI, vol. 36, no. 2, pp. 1711-1719, June 2022, there is a problem that the learning improvement effect is small with respect to a pair whose similarity is much higher or lower than a threshold.

SUMMARY OF THE INVENTION

The present invention provides a technique for improving the authentication accuracy by learning other cases while focusing on a pair whose similarity is close to a threshold.

According to an aspect of the present invention, there is provided a learning apparatus comprising: one or more processors; and one or more memories storing executable instructions which, when executed by the one or more processors, cause the learning apparatus to function as: a first acquisition unit configured to acquire at least one pair of an image and a label; a first calculation unit configured to calculate a feature vector from the image using a feature extractor; a second calculation unit configured to calculate, as a positive pair similarity, a similarity between a first feature vector calculated by the first calculation unit from the image acquired by the first acquisition unit and a second feature vector associated with the same label as the label acquired by the first acquisition unit, and calculate, as a negative pair similarity, a similarity between the first feature vector calculated by the first calculation unit from the image acquired by the first acquisition unit and a third feature vector associated with a label different from the label acquired by the first acquisition unit; a decision unit configured to decide a similarity threshold; a third calculation unit configured to calculate a loss value with respect to the positive pair similarity lower than the threshold; a fourth calculation unit configured to calculate a loss value with respect to the negative pair similarity higher than the threshold; and a learning unit configured to learn a parameter of the feature extractor that decreases the loss value calculated by the third calculation unit and the loss value calculated by the fourth calculation unit, wherein one of the third calculation unit and the fourth calculation unit uses a loss function including a function such that an absolute value of a gradient is larger near a predetermined threshold and is non-zero but smaller even at a point away from the threshold.

Further features of the present invention will become apparent from the following description of exemplary embodiments with reference to the attached drawings.

BRIEF DESCRIPTION OF THE DRAWINGS

FIG. 5B is a flowchart illustrating details of processing in step S204*a*;

FIG. 5C is a table for explaining processing of determining equality in accordance with an attribute;

DESCRIPTION OF THE EMBODIMENTS

Figure 1A:
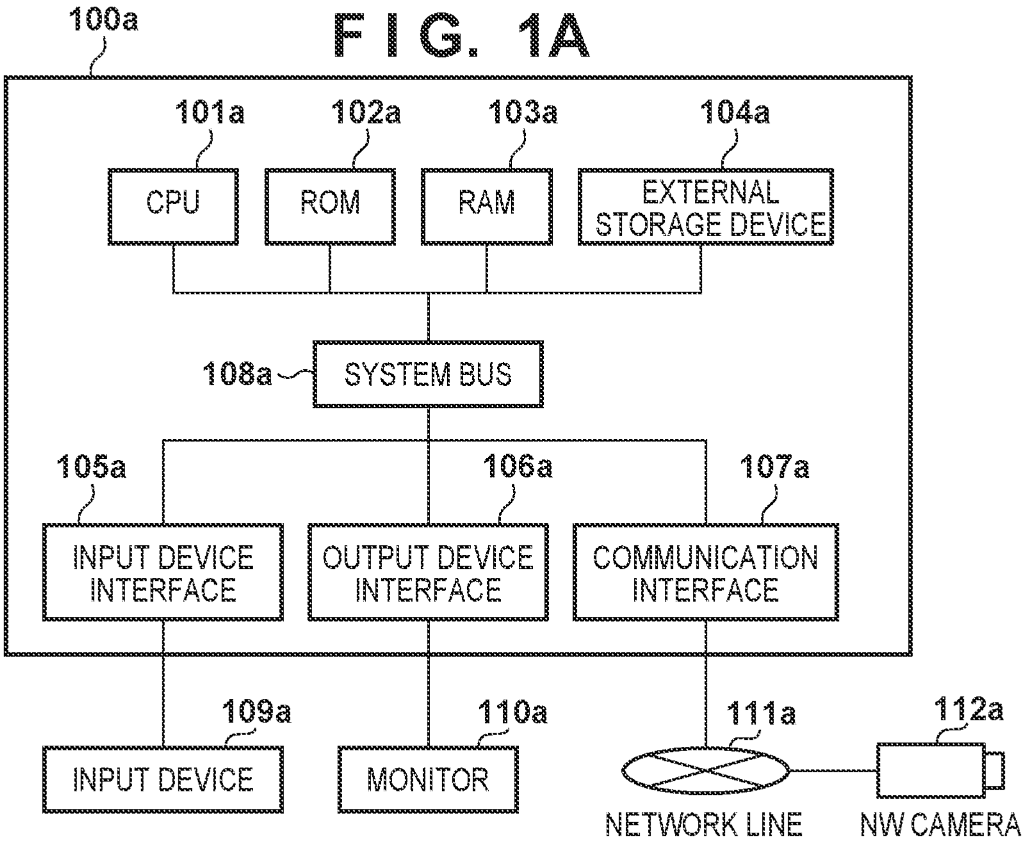
FIG. 1A is a block diagram showing an example of the hardware arrangement of a computer apparatus 100*a*.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

First, an example of the hardware arrangement of a computer apparatus 100*a* applicable to a learning apparatus or an inference apparatus will be described with reference to a block diagram shown in FIG. 1A. Note that the hardware arrangement of a computer apparatus applied to the learning apparatus and the hardware arrangement of a computer apparatus applied to the inference apparatus may be the same or different. Alternatively, one computer apparatus may be used to execute both the functions of the learning apparatus and the inference apparatus.

A CPU (Central Processing Unit) 101*a* executes various kinds of processes using computer programs and data stored in a ROM 102*a* and a RAM 103*a*. Thus, the CPU 101*a* performs operation control of the overall computer apparatus 100*a,* and also executes or controls various kinds of processes to be described as processes performed by the learning apparatus or the inference apparatus.

The ROM (Read Only Memory) 102*a* stores setting data of the computer apparatus 100*a,* a computer program and data associated with activation of the computer apparatus 100*a,* a computer program and data associated with the basic operation of the computer apparatus 100*a,* and the like.

The RAM (Random Access Memory) 103*a* includes an area used to store a computer program and data loaded from the ROM 102*a* or an external storage device 104*a*. Furthermore, the RAM 103*a* includes an area used to store a computer program and data externally received via a communication interface 107*a*. The RAM 103*a* also includes a work area used by the CPU 101*a* to execute various kinds of processes. As described above, the RAM 103*a* can provide various kinds of areas, as appropriately.

The external storage device 104*a* is a mass information storage device such as a hard disk drive device. The external storage device 104*a* stores an OS (Operating System), and computer programs and data for causing the CPU 101*a* to execute or control various kinds of processes to be described as processes performed by the learning apparatus or the inference apparatus. The computer programs and data stored in the external storage device 104*a* are loaded into the RAM 103*a,* as appropriately, under the control of the CPU 101*a,* and processed by the CPU 101*a*.

Note that the external storage device 104*a* may include a memory card, an optical disk such as a Flexible Disk (FD) and Compact Disk (CD) detachable from the computer apparatus 100*a,* a magnetic or optical card, an IC card, and a memory card.

An input device 109*a* is connected to an input device interface 105*a*. The input device 109*a* is a user interface such as a keyboard, a mouse, or a touch panel screen, and can input various kinds of instructions to the CPU 101*a* when it is operated by the user.

A monitor 110*a* is connected to an output device interface 106*a*. The monitor 110*a* includes a liquid crystal screen or a touch panel screen, and displays a processing result of the CPU 101*a* by an image or characters. Note that in addition to or instead of the monitor 110*a,* a projection apparatus such as a projector may be provided.

The communication interface 107*a* is an interface used to perform data communication with the outside, and is connected to a network line 111*a* such as a LAN or the Internet in FIG. 1A. The network line 111*a* is connected to a network camera (NW camera) 112*a* that captures a moving image or periodically or nonperiodically captures a still image.

The captured image (the image of each frame of the moving image or the periodically or nonperiodically captured still image) captured by the network camera 112*a* is received by the external storage device 104*a* or the RAM 103*a* via the network line 111*a* and the communication interface 107*a*.

The CPU 101*a,* the ROM 102*a,* the RAM 103*a,* the external storage device 104*a,* the input device interface 105*a,* the output device interface 106*a,* and the communication interface 107*a* are all connected to a system bus 108*a*.

Learning Apparatus

Figure 1B:
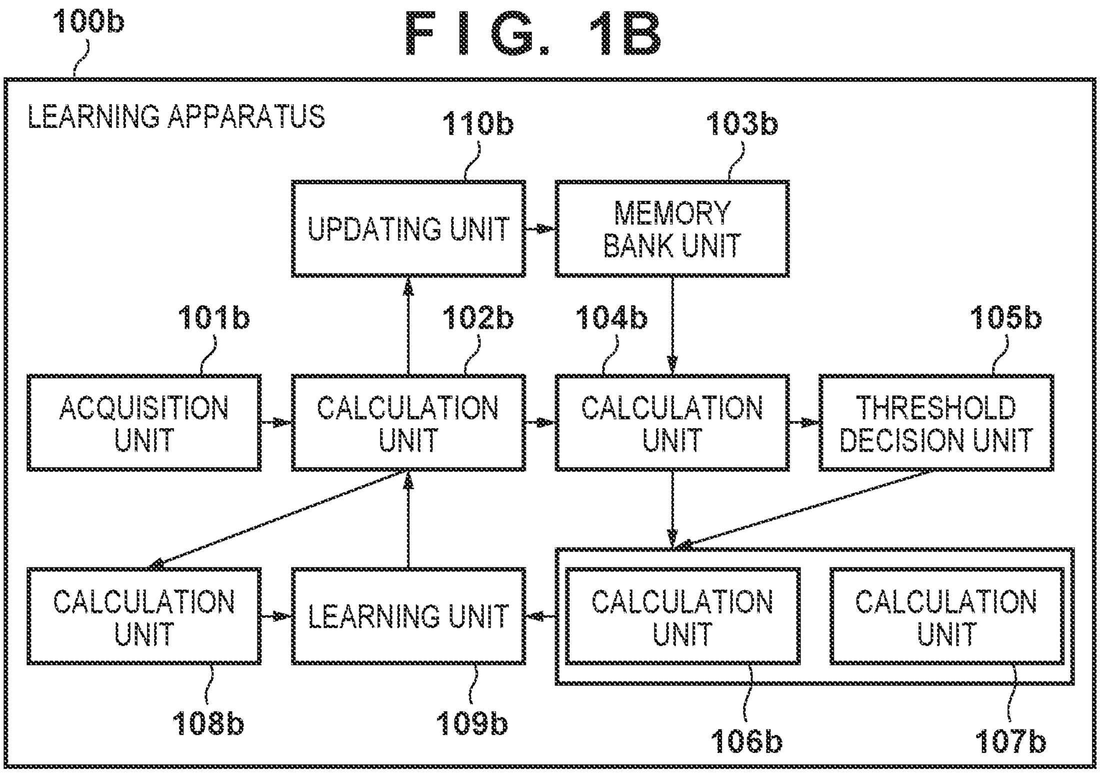
FIG. 1B is a block diagram showing an example of the functional arrangement of a learning apparatus 100*b*.

An example of the functional arrangement of a learning apparatus 100*b* according to this embodiment will be described with reference to a block diagram shown in FIG. 1B. Note that a function unit shown in FIG. 1B may be described as the main constituent of processing but the function of the function unit is actually implemented when the CPU 101*a* executes a computer program corresponding to the function unit. Note also that one or more of the function units shown in FIG. 1B may be implemented by hardware.

The learning apparatus according to this embodiment learns a face authentication task for determining whether faces included in two images are the face of the same person. More specifically, learning is performed so that feature vectors are calculated from the respective images and the similarity between the two feature vector becomes high in a case where the faces of the persons included the respective images are identical. Note that in this embodiment, as the similarity, the cosine similarity (to be referred to as the cos similarity hereinafter) between the vectors is used. However, the Euclidean distance or the like may be used as the similarity, and the definition of the similarity is not limited to a specific form.

An acquisition unit 101*b* acquires one or more pairs (learning data) each including an image and the label (person label) of a person included in the image. The one or more pairs (pairs of images and person labels) obtained by the acquisition unit 101*b* will be referred to as a mini batch hereinafter. A pair of an image and a person label will sometimes be referred to as a sample hereinafter. The image includes the face image of the person. The person label is information representing the ID of the person, and the same label value indicates the same person. The pair of the image and the person label is stored in the external storage device 104*a* or the like. Note that the person label may have a folder structure, and then images of the same person may collectively be stored in a folder and the images of the same person may be determined because they are stored in the same folder. The method of giving the person label is not limited to them.

A calculation unit 102*b* calculates, from an image, a feature vector to be used for authentication. To calculate a feature vector, a neural network is used as a feature extractor. For example, a Convolutional Neural Network (CNN) as a kind of neural network is used as the feature extractor. The CNN extracts abstraction information from an input image by repeatedly performing, for the input image, processing including convolutional processing, activation processing, and pooling processing. At this time, a processing unit of the convolutional processing, activation processing, and pooling processing is often called a layer. There are many known methods as the activation processing used at this time but, for example, a method called a Rectified Linear Unit (ReLU) may be used. Furthermore, there are many known methods as the pooling processing but, for example, a method called Max pooling may be used. For example, as the structure of the CNN, ResNet introduced by a non-patent literature (K. He, X. Zhang, S. Ren, and J. Sun. Identity mappings in deep residual networks. In ECCV, 2016) and the like may be used. Alternatively, a neural network known as a Vision Transformer (ViT) and described in a non-patent literature (Alexey Dosovitskiy, et al. An image is worth 16×16 words: Transformers for image recognition at scale. In ICLR, 2021) may be used. Note that the structure of the neural network is not limited to them. The calculation unit 102*b* holds information such as the weight and the structure of the neural network in the RAM 103*a* or the like.

A memory bank unit 103*b* holds a feature vector in association with a person label. The memory bank unit 103*b* holds m feature vectors for each person label where m represents a predetermined constant. The memory bank unit 103*b* holds the person labels and the feature vectors in the RAM 103*a* or the like.

A calculation unit 104*b* acquires the feature vector acquired by the calculation unit 102*b* from the image acquired by the acquisition unit 101*b*. Then, the calculation unit 104*b* obtains, as a "positive pair similarity", the similarity of a pair (positive pair) of the acquired feature vector and the feature vector of the same person label as that of the image among the feature vectors held in the memory bank unit 103*b*. Furthermore, the calculation unit 104*b* obtains, as a "negative pair similarity", the similarity of a pair (negative pair) of the acquired feature vector and the feature vector of a person label different from that of the image among the feature vectors held in the memory bank unit 103*b*.

A threshold decision unit 105*b* acquires a threshold used for loss calculation (to be described later). For example, the threshold decision unit 105*b* may acquire a threshold held in advance in the RAM 103*a*. Alternatively, for example, the threshold decision unit 105*b* may acquire, as a threshold, the similarity of top N % negative pairs among the negative pairs obtained by the calculation unit 104*b* where N represents a predetermined constant. Furthermore, for example, the threshold decision unit 105*b* may acquire, as a threshold, a false acceptance rate (for example, 0.001%) or the like at the time of the operation of face authentication. The threshold acquisition method is not limited to them.

A calculation unit 106*b* calculates a loss with respect to the positive pair similarity lower than the threshold obtained by the threshold decision unit 105*b*. A calculation unit 107*b* calculates a loss with respect to the negative pair similarity higher than the threshold obtained by the threshold decision unit 105*b*.

A calculation unit 108*b* learns, for each person label, representative vectors each having dimensions the number of which is equal to that of the feature vector calculated by the calculation unit 102*b*. Then, the calculation unit 108*b* calculates a loss that is close to the representative vector of the same person label among the representative vectors and is far from the representative vector of the different person label among the representative vectors. The calculation unit 108*b* calculates a loss using, for example, a loss function such as ArcFace described in a non-patent literature (J. Deng, J. Guo, N. Xue, and S. Zafeiriou. ArcFace: Additive angular margin loss for deep face recognition. In CVPR, 2019).

A learning unit 109*b* updates (learns) the neural network used by the calculation unit 102*b* so that the loss is minimized As the loss, the loss calculated by each of the above-described calculation units 106*b*, 107*b*, and 108*b* is used. To update (learn) the neural network, general back propagation or the like is used.

An updating unit 110*b* updates the feature vectors held in the memory bank unit 103*b* using the feature vector obtained from the image acquired by the acquisition unit 101*b*. The memory bank unit 103*b* holds up to m feature vectors for each person label. If the number of feature vectors held in the memory bank unit 103*b* in correspondence with the person label of the image is smaller than m, the new feature vector is stored in the memory bank unit 103*b*. If m feature vectors are held in the memory bank unit 103*b* in correspondence with the person label of the image, the oldest registered feature vector is deleted and the new feature vector is stored.

Learning Loop Processing

Learning loop processing according to this embodiment will be described with reference to a flowchart shown in FIG. 2A. Step S201*a* is the start of an epoch loop. Use of all learning data stored in the external storage device 104*a* for learning processing by one round is called one epoch. An iteration epoch number is determined in advance. To count the number of iterations of an epoch, the CPU 101*a* initializes a variable i to 1. If the value of the variable i is equal to or smaller than the iteration epoch number, the process advances to step S202*a*; otherwise, the process exits from the loop and ends.

Step S202*a* is the start of a mini batch loop. The number of samples forming a mini batch is determined in advance, and the learning data is divided into mini batches by the number of samples. Each mini batch is assigned with a number from 1. To refer to the number using a variable j, the CPU 101*a* first initializes the value of the variable j to 1. If the value of the variable j is equal to or smaller than the total number of mini batches, the process advances to step S203*a*; otherwise, the process exits from the loop, and advances to step S206*a*.

In step S203*a*, the jth mini batch among the learning data is acquired. More specifically, the acquisition unit 101*b* acquires a pair of a learning image and a person label. Note that the acquisition unit 101*b* may perform image processing known as Data Augmentation for the acquired image. For example, the acquisition unit 101*b* may perform processing such as change of the tint of the image or addition of noise to pixel values.

In step S204*a*, learning is performed using the mini batch obtained in step S203*a*. Details of the processing in step S204*a* will be described later with reference to a flowchart shown in FIG. 2B.

Step S205*a* is the end of the mini batch loop, in which the CPU 101*a* adds 1 to the value of the variable j, and the process advances to step S202*a*. Step S206*a* is the end of the epoch loop, in which the CPU 101*a* adds 1 to the value of the variable i, and the process returns to step S201*a*.

Learning Step Processing

Details of the learning step processing performed in step S204*a* will be described with reference to the flowchart shown in FIG. 2B. In step S201*b*, the calculation unit 102*b* calculates a feature vector from the image included in the mini batch acquired by the acquisition unit 101*b*.

In step S202*b*, the calculation unit 104*b* obtains the similarity (positive pair similarity) of a pair (positive pair) of the acquired feature vector and the feature vector, among the feature vectors held in the memory bank unit 103*b*, of the same person label as that of the image included in the mini batch acquired by the acquisition unit 101*b*. Furthermore, the calculation unit 104*b* obtains the similarity (negative pair similarity) of a pair (negative pair) of the acquired feature vector and the feature vector, among the feature vectors held in the memory bank unit 103*b*, of a person label different from that of the image.

More specifically, for each sample of the mini batch, the calculation unit 104*b* acquires the feature vector of the same person label as that included in the sample from the memory bank unit 103*b*, and obtains the similarity between the feature vectors as the positive pair similarity. Furthermore, the calculation unit 104*b* also obtains the feature vector of a person label different from that included in the sample, and obtains the similarity between the feature vectors as the negative pair similarity.

In step S203*b*, the threshold decision unit 105*b* acquires a threshold to be used for loss calculation (to be described later). In this embodiment, the threshold decision unit 105*b* acquires a predetermined threshold th.

In step S204*b*, the calculation unit 106*b* calculates the loss of the positive pair. More specifically, the calculation unit 106*b* calculates the loss of the positive pair using equations (1) and (2) below.

$$l_p = \begin{cases} \sqrt[N]{\left(-1.0 \times \frac{sim_p - th}{r}\right)} & \text{if } sim_p < th \\ 0 & \text{otherwise} \end{cases} . \tag{1}$$

$$L_p = \frac{1}{N_p} \sum l_p \tag{2}$$

Equation (1) is an equation for obtaining the loss (positive loss) of one positive pair, and equation (2) is an equation for summing the losses of all the positive pairs, where $l_p$ represents the loss of a given positive pair, sim p represents the similarity of the positive pair, th represents the threshold acquired in step S203*b*, r represents a preset constant such that as r is smaller, the loss with respect to the pair away from the threshold is larger, and N represents the index of the radical root, for which a fixed value such as N=2 is used. If the similarity of the positive pair is lower than the threshold, the upper radical root expression in equation (1) is applied; otherwise, the loss of the positive pair is zero.

Furthermore, $L_p$ represents the loss of all the positive pairs. $N_p$ represents the number of positive pairs each having the similarity lower than the threshold. That is, $N_p$ represents the number of positive pairs to which the upper expression in equation (1) is applied.

In step S205*b*, the calculation unit 107*b* calculates the loss of the negative pair. More specifically, the calculation unit 107*b* calculates the loss of the negative pair using equations (3) and (4) below.

$$l_n = \begin{cases} \sqrt[N]{\left(\frac{sim_n - th}{r}\right)} & \text{if } sim_n > th \\ 0 & \text{otherwise} \end{cases} . \tag{3}$$

$$L_n = \frac{1}{N_n} \sum l_n \tag{4}$$

Equation (3) is an equation for obtaining the loss (negative loss) of one negative pair, and equation (4) is an equation for summing the losses of all the negative pairs, where $l_n$ represents the loss of a given negative pair, $sim_n$ represents the similarity of the negative pair, th represents the threshold acquired in step S203*b*, r represents the preset constant such that as r is smaller, the loss with respect to the pair away from the threshold is larger, and N represents the index of the radical root, for which a fixed value such as N=2 is used. If the similarity of the negative pair is higher than the threshold, the upper radical root expression in equation (3) is applied; otherwise, the loss of the negative pair is zero. $L_n$ represents the loss of all the negative pairs. $N_n$ represents the number of negative pairs each having the similarity higher than the threshold. That is, $N_n$ represents the number of negative pairs to which the upper expression in equation (3) is applied.

In step S206*b*, the calculation unit 108*b* learns, for each person label, the representative vectors each having dimensions the number of which is equal to that of the feature vector calculated by the calculation unit 102*b*, thereby obtaining a loss such as ArcFace described above.

In step S207*b*, the learning unit 109*b* updates (learns) the neural network used by the calculation unit 102*b* by back propagation so as to minimize a loss L given by:

$$L = L_{cls} + \lambda_1 \times L_P + \lambda_2 \times L_n \tag{5}$$

where $L_{cls}$ represents the loss (representative vector loss) obtained in step S206*b*, and $\lambda_1$ and $\lambda_2$ represent weighting parameters and are constants defined in advance.

Note that in back propagation, the update amount of each weight of the neural network is calculated from the value of a gradient as a first-order derivative of the loss function. At this time, since $sim_p$=th in equation (1) and $sim_n$=th in equation (3) are non-differentiable points, if the similarity takes this value, learning is advanced by setting the value of the gradient to 0 (the same applies to non-differentiable points of the equation of another loss function). In step S208*b*, the updating unit 110*b* updates the feature vectors held in the memory bank unit 103*b* using the feature vector of the mini batch.

Detailed Description of Loss Function

Figure 3A:
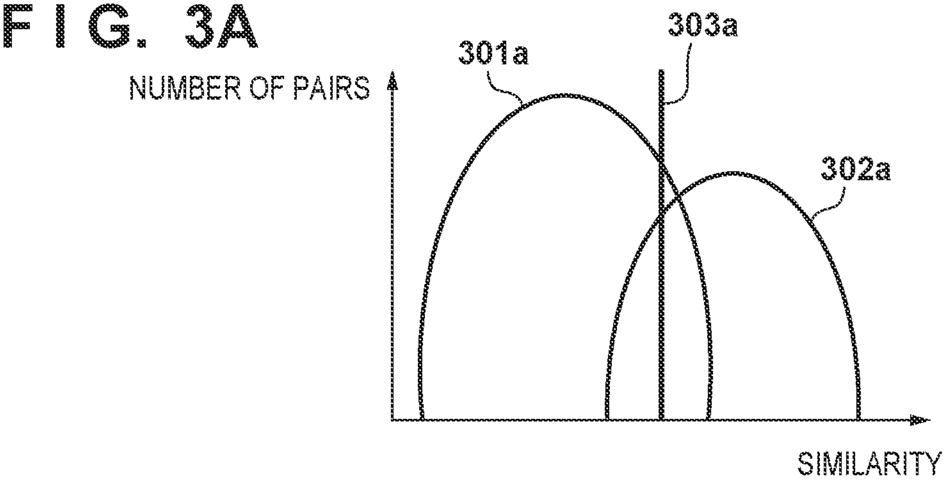
FIG. 3A is a graph for explaining a positive loss and a negative loss.
Figure 3B:
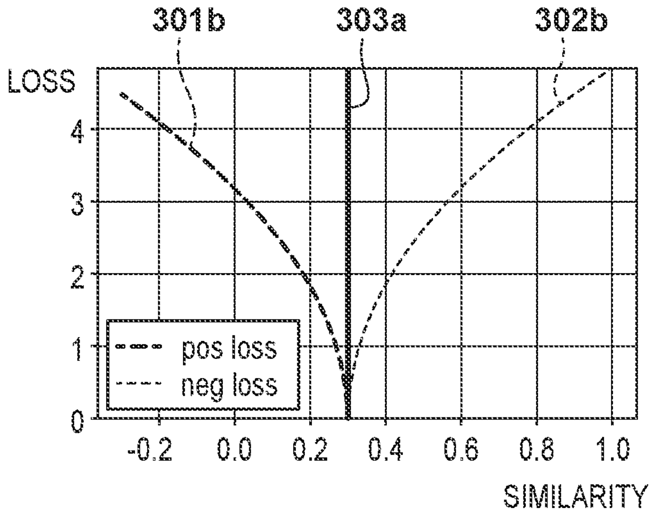
FIG. 3B is a graph for explaining the positive loss and the negative loss.
Figure 3C:
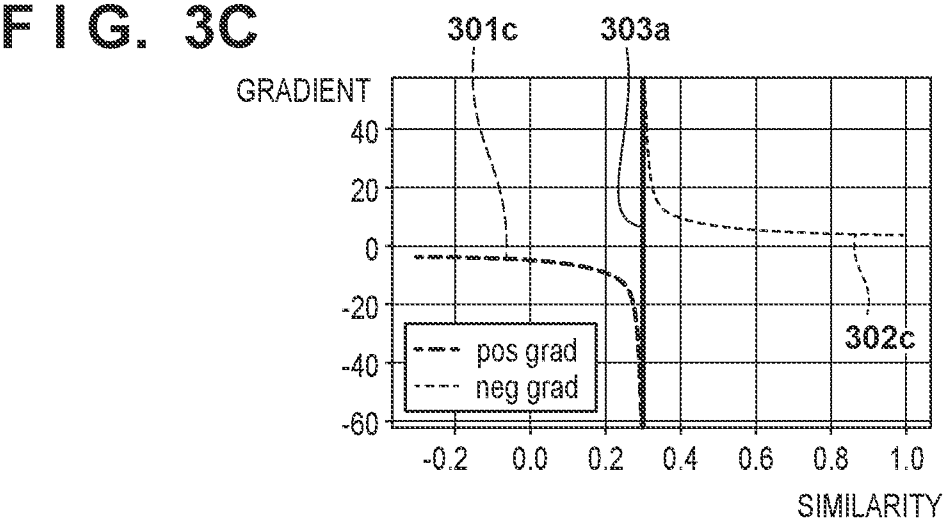
FIG. 3C is a graph for explaining the positive loss and the negative loss.

The positive loss and the negative loss described in equations (1) and (3) will be explained in detail with reference to FIGS. 3A to 3G. FIG. 3A is a histogram showing the number of present pairs for each similarity. Reference numeral 301*a* denotes negative pairs; 302*a*, positive pairs; and 303*a*, a threshold. Since a loss is generated for a positive pair on the left side of the threshold and a negative pair on the right side of the threshold, a graph of the loss and the similarity is as shown in FIG. 3B. Reference numeral 301*b* denotes the loss of the positive pair; and 302*b*, the loss of the negative pair. Furthermore, FIG. 3C shows the derivatives of the loss functions. Reference numeral 301*c* denotes the derivative of the positive loss; and 302*c*, the derivative of the negative loss. It is apparent from FIG. 3C that the absolute value of the gradient is large around the threshold 303*a*. Thus, the positive pair and the negative pair are strongly learned around the threshold. In addition, as the similarity is farther away from the threshold, the absolute value of the gradient abruptly decreases but does not disappear to zero, and a pair away from the threshold is also learned. Therefore, while concentratedly learning the pairs close to the threshold, learning can be performed to improve the pairs away from the threshold.

Note that the radical root is used in the above equations. However, another function may be used. For example, a log function may be used. For example, if a log function is used for the loss function of each of equations (1) and (3), equations (6) and (7) below are obtained.

$$l_p = \begin{cases} \log\left(-1.0 \times \frac{sim_p - th}{r} + 1.0\right) & \text{if } sim_p < th \\ 0 & \text{otherwise} \end{cases} . \tag{6}$$

-continued $$l_n = \begin{cases} \log\left(\frac{sim_n - th}{r} + 1.0\right) & \text{if } sim_n > th \\ 0 & \text{otherwise} \end{cases}. \tag{7}$$

Unlike equations (1) and (3), to avoid the antilogarithm of the log function from being zero, 1 is added. Alternatively, a negative inverse proportional function may be used, as given by:

$$l_p = \begin{cases} \frac{-1}{-1.0 \times \frac{sim_p - th}{r} + 1.0} & \text{if } sim_p < th \\ 0 & \text{otherwise} \end{cases}. \tag{8}$$

$$l_n = \begin{cases} \frac{-1}{\frac{sim_n - th}{r} + 1.0} & \text{if } sim_n > th \\ 0 & \text{otherwise} \end{cases}. \tag{9}$$

Alternatively, an arc tangent function may be used, as given by:

$$l_p = \frac{1}{\pi}\tan^{-1}\left(-1.0 \times \frac{sim_p - th}{r}\right) \tag{10}$$

$$l_p = \frac{1}{\pi}\tan^{-1}\left(\frac{sim_n - th}{r}\right) \tag{11}$$

Note that a loss function for which an arc tangent function is used has no non-differentiable points, and non-zero values are obtained over the entire area of the similarity. The above examples of the function all have a characteristic that "the absolute value of the gradient is large (larger) near (in proximity to) the predetermined threshold and is small (smaller) even at a point away from the threshold". This is because the gradient (the derivative of the loss) is "a function that is to have a negative exponent". A power function is a function of a form of $x^a$, and a is the exponent of the power function. "A function that is to have a negative exponent" is "a function that is to have a negative exponent" even in differentiation, and thus has the effect of abruptly suppressing an output with respect to an increase in input. Therefore, although the gradient is large near the threshold, the gradient abruptly decreases as the similarity is farther away from the threshold. For example, if the loss function is a log function log(x), the first-order derivative is $x^{-1}$ and the second-order derivative is $-x^{-2}$As an input x increases, the absolute value $|x^{-1}|$ of the first-order derivative decreases. Thus, as x increases, the gradient of the log function also decreases. In addition, since the absolute value $|-x^{-2}|$ of the second-order derivative also decreases, the gradient of the log function "abruptly" decreases as x increases. Even in the radical root or the inverse proportional function in the above equation, the first-order derivative is "a function that is to have a negative exponent", and thus the trend is formed. Since the first-order derivative of the arc tangent function $\tan^{-1}$ (x) is $(1+x^2)^{-1}$, and is "a function that is to have a negative exponent", the trend is formed. Note that the first-order derivative of the loss function for which the arc tangent function of equation (11) is used is known as the Cauchy distribution. In the first-order derivative, "the function that is to have a negative exponent" is not limited to the radical root, the inverse proportional function, the log function, the arc tangent function, and the like.

Figure 3D:
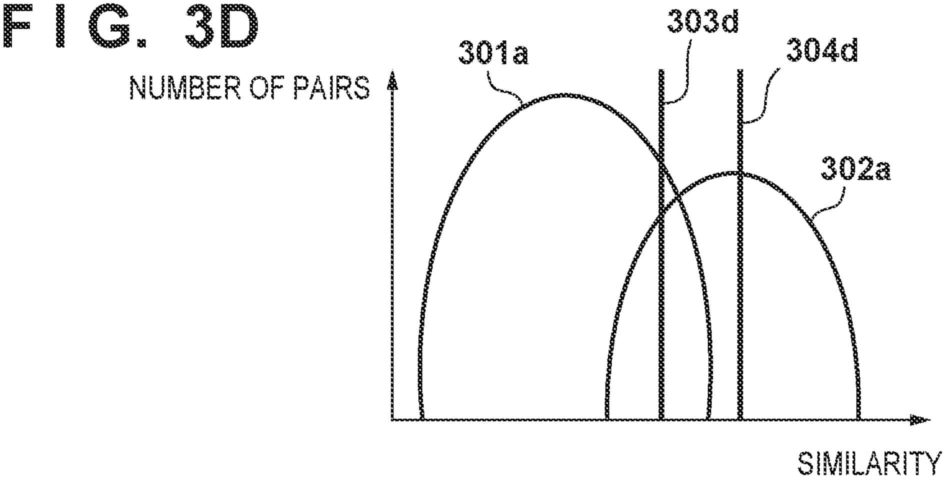
FIG. 3D is a graph for explaining the positive loss and the negative loss.

Furthermore, as compared with the sigmoid function used in J. Liu, H. Qin, Y. Wu, and D. Liang, "AnchorFace: Boosting TAR@FAR for Practical Face Recognition", AAAI, vol. 36, no. 2, pp. 1711-1719, June 2022, the gradient of the sigmoid function is formed by an exponential function. Therefore, the gradient decreases more abruptly than the power function, and then disappears. Thus, by using "the function that is to have a negative exponent", the characteristic that "the absolute value of the gradient is small even at a point away from the threshold". FIG. 3G is a graph for comparing the sigmoid function with the gradient by exemplifying the negative loss using the log function of equation (7). The negative loss of the sigmoid function is obtained by:

$$l_n = \frac{1}{1 + \exp\left(-\frac{sim_n - th}{t}\right)} \tag{12}$$

where t represents a parameter for controlling the inclination of the sigmoid function. FIG. 3G is a view of comparison between the gradients of equation (7) (log function) and equation (12) (sigmoid function). Since the update amount of the weight of the neural network in accordance with the magnitude of the gradient can be adjusted by a learning rate or the like, the magnitude of the gradient is not important. Thus, to make it easy to perform comparison, both the gradients are divided by the maximum value to be normalized to a range of 0 to 1. Furthermore, FIG. 3G shows a similarity range of 0 or more. In FIG. 3G, reference numeral 303*a* denotes a threshold which is 0.3 in this example. In FIG. 3G, reference numerals 304*g*, 305*g*, and 306*g* denote the gradients of equation (12) of the sigmoid function when t=0.03, t=0.1, and t=0.2, respectively; and 302*g*, the gradient of equation (7) of the log function when r=0.03. As shown in FIG. 3G, with respect to 304*g* for which the parameter t for controlling the inclination is small, a gradient occurs only near the threshold and then abruptly disappears to zero. On the other hand, if the parameter t is increased to forcibly avoid the gradient from disappearing, the gradient also gradually occurs in an area where the similarity is high. However, the property that the gradient abruptly decreases is lost, and the property of concentratedly performing learning near the threshold is lost. To the contrary, with respect to 302*g* of equation (7), as the similarity is farther away from the threshold, the gradient abruptly decreases but has a small value without disappearing to zero. Note that FIG. 3G exemplifies the negative loss but the same applies to the positive loss. Furthermore, although equation (7) the log function is compared with the sigmoid function, the same trend is obtained even in the function such as the radical root, the inverse proportional function, or the arc tangent function since the gradient is "a power function".

Note that "a function such that the absolute value of the gradient is large near the predetermined threshold and is non-zero but small even at a point away from the threshold" may be combined with the sigmoid function. For example, it is considered to use a log function or the like in a predetermined domain. For example, the abrupt loss of the sigmoid function may be used near the threshold, and the log function may be used in a portion away from the threshold. Alternatively, the sum of the log function or the like and the sigmoid function may be set as a loss function. In this case, the log function or the like is used for a given term of a polynomial. The form in which "a function such that the absolute value of the gradient is large near the predetermined threshold and is non-zero but small even at a point away from the threshold" is included in the loss function is not limited to them.

In the above description, the same function is used for both the positive loss and the negative loss but different functions may be used for them. Alternatively, a function having no property that "the absolute value of the gradient decreases" may be used for one of the positive loss and the negative loss. That is, all the similarity pairs may be used for learning without decreasing the gradient as the similarity is farther away from the threshold. This makes it possible to concentratedly perform learning near the threshold with respect to one of the positive loss and the negative loss but perform learning over the entire area without limitation to an area near the threshold with respect to the other of the positive loss and the negative loss.

Example of Loss Function Using Plural Thresholds

In the above example, the threshold decision unit 105*b* acquires only one threshold, and the same threshold is used for both the positive loss and the negative loss. However, different thresholds may be used. More specifically, the thresholds are given by equations (13) and (14) below. An example of using a log function will be described but a function such as a radical root may be used.

$$l_p = \begin{cases} \log\left(-1.0 \times \frac{sim_p - th_p}{r} + 1.0\right) & \text{if } sim_p < th_p \\ 0 & \text{otherwise} \end{cases}. \quad (13)$$

$$l_n = \begin{cases} \log\left(\frac{sim_n - th_n}{r} + 1.0\right) & \text{if } sim_n > th_n \\ 0 & \text{otherwise} \end{cases}. \quad (14)$$

where $th_p$ represents a positive threshold and thp represents a negative threshold. FIG. 3D shows a histogram of the similarity in a case where two thresholds are used. Reference numeral 304*d* denotes a positive threshold; and 303*d*, a negative threshold. By setting the positive threshold 304*d* to be larger than the negative threshold 303*d*, the similarity of the positive pair can be increased with a margin with respect to the negative threshold 303*d*. Thus, when a face authentication system is operated using the negative threshold 303*d*, the possibility that the similarity of the positive pair is erroneously lower than the threshold decreases, and it is possible to prevent non-authentication.

In addition, a small loss may be applied to a positive pair having the similarity higher than the positive threshold 304*d*. That is, a loss is applied to a positive pair having the similarity higher than the positive threshold 304*d* shown in FIG. 3D. More specifically, equation (15) below is used.

$$l_p = \begin{cases} \log\left(e^{-u(sim_p - th_p)} + 1.0\right) & \text{if } sim_p \geq th_p \\ \log\left(2.0 \times \left(-1.0 \times \frac{sim_p - th_p}{r} + 1.0\right)\right) & \text{if } sim_p < th_p \\ 0 & \text{otherwise} \end{cases}. \quad (15)$$

where u represents a parameter that adjusts the degree of a loss applied to a pair having the similarity higher than the positive threshold. As u is increased, a loss is strongly applied to positive pairs near the threshold, and as u is decreased, a loss is widely applied to positive pairs away from the threshold.

Figure 3E:
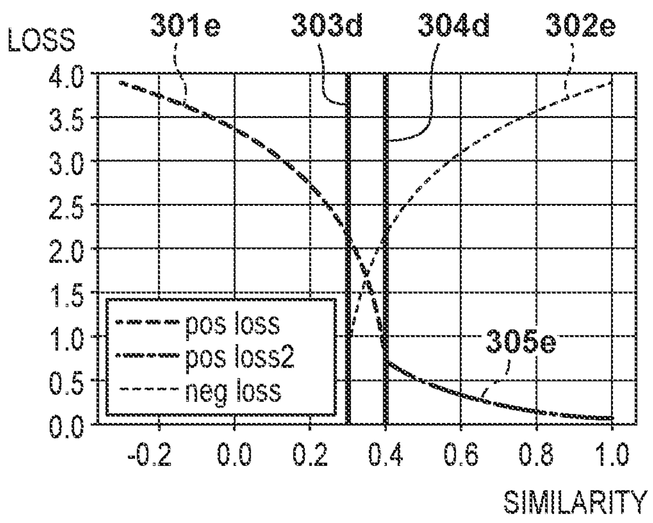
FIG. 3E is a graph for explaining the positive loss and the negative loss.

FIG. 3E shows the shape of the loss function. Reference numeral 304*d* denotes the positive threshold; and 303*d*, the negative threshold. Reference numeral 301*e* denotes a loss function applied to a positive pair having the similarity lower than the positive threshold, as described above. On the other hand, reference numeral 305*e* denotes a loss function applied to a positive pair having the similarity higher than the positive threshold. The loss function 305*e* generates a loss value smaller than that generated by the loss function 301*e*. Reference numeral 302*e* denotes a negative loss, which is obtained by visualizing equation (14) above.

Figure 3F:
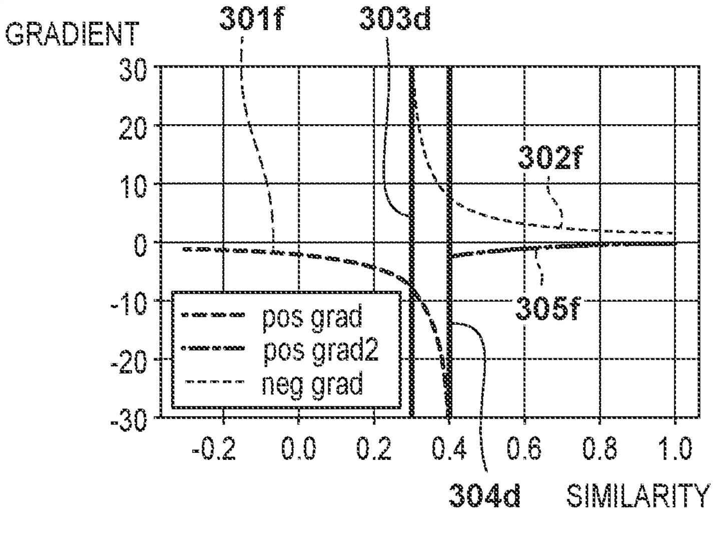
FIG. 3F is a graph for explaining the positive loss and the negative loss.
Figure 3G:
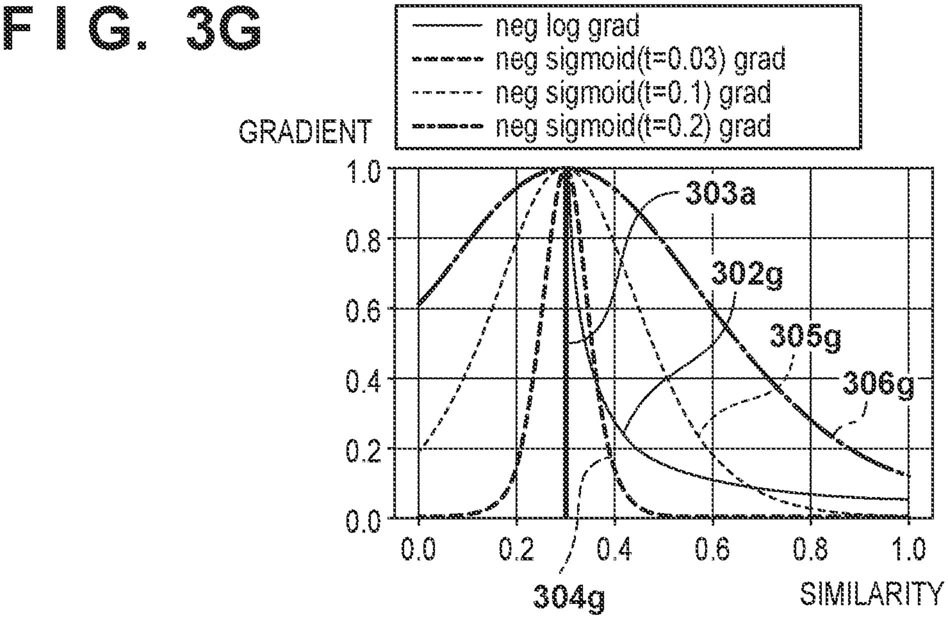
FIG. 3G is a graph for explaining the positive loss and the negative loss.

Furthermore, FIG. 3F shows a graph of the derivatives of the losses. Reference numeral 302*f* denotes the derivative of the loss of a negative pair having the similarity higher than the negative threshold corresponding to the negative loss 302*e*; 301*f*, the derivative of the loss of a positive pair having the similarity lower than the positive threshold corresponding to the loss function 301*e*; and 305*f*, a derivative for a positive pair having the similarity higher than the positive threshold corresponding to the loss function 305*e*. With respect to all the derivatives 302*f*, 301*f*, and 305*f*, as the similarity is farther away from the threshold, the absolute value of the gradient decreases. Therefore, while concentratedly learning pairs near the threshold, pairs away from the thresholds are gradually learned. In addition, by comparing the derivatives 301*f* and 305*f* with each other, update of the gradient by a positive pair having the similarity higher than the threshold is relatively minor. Therefore, it is possible to maintain the similarities of the positive pairs high while prioritizing update of a positive pair having the similarity lower than the threshold.

Two or more positive thresholds or negative thresholds may be provided. For example, when two negative thresholds are provided, the negative loss is given by:

$$l_n = \begin{cases} 0 & \text{if } sim_n \geq th1_n \\ \log\left(\frac{sim_n - th_n}{r} + 1.0\right) & \text{if } th1_n > sim_n > th2_n \\ 0 & \textit{otherwize} \end{cases}. \quad (16)$$

where $th1_n$ represents the first negative threshold and $th2_n$ represents the second negative threshold. When the similarity exceeds the first negative threshold, the loss becomes zero. In a portion between the first negative threshold and the second negative threshold, the same loss as the above-described negative loss is applied. This prevents the negative pair having the similarity higher than the predetermined similarity from being used for learning. Therefore, it is possible to ignore the high similarity obtained by processing an actually positive pair as a negative pair because of an error of a person label or the like. Similarly, it is possible to ignore the low similarity caused by noise by setting even the positive loss to zero in a case where the loss is smaller than the predetermined value. Note that when learning is performed, as described above, the face authentication system is operated using the negative threshold $th2_n$. Note that an example in which log functions are used for equations (13) to (16) has been explained but a radical root and the like may be used.

Modification of Learning Apparatus

In the above description, the representative vector loss is also used as a loss, but need not be used. Alternatively, the representative vector loss may be combined with another loss of face authentication. For example, a triplet loss described in a non-patent literature (Florian Schroff, Dmitry Kalenichenko, and James Philbin. Facenet: A unified embedding for face recognition and clustering. In CVPR, 2015) may be used. At this time, the calculation unit 108*b* may be deleted to change the arrangement to, for example, calculate a triplet loss. Alternatively, other losses may be combined, and the combination of losses is not limited to them.

Furthermore, in the above description, a pair is formed from the feature vector obtained from the mini batch and the feature vector in the memory bank. However, a pair may be formed only from the mini batch. That is, a positive pair is formed from the feature vectors of the same person label in the mini batch and a negative pair is formed from the feature vectors of different person labels. At this time, the arrangement may be changed by excluding the memory bank unit 103*b* and the updating unit 110*b*. Furthermore, in the above description, the acquisition unit 101*b* acquires one or more pairs of the images and the person labels. However, the acquisition unit 101*b* may acquire "a pair of images" and "the label of the pair". "The label of the pair" indicates one of the positive pair and the negative pair. At this time, the calculation unit 104*b* need not create a pair and changes the arrangement to obtain the similarity of each pair.

In the above description, an old feature vector is also used for learning as long as it is not deleted from the memory bank unit 103*b*. However, an "effective time" may be set for each feature vector, and the feature vector exceeding the effective time may not be used for learning. More specifically, the memory bank unit 103*b* holds an effective time (integer value) for each feature vector. When the updating unit 110*b* registers a feature vector in step S208*b*, the effective time (predetermined positive integer value) is set for the feature vector, and 1 is subtracted from the effective time of the feature vector stored in the memory bank unit 103*b* with a lapse of time. Then, when the pair similarity is calculated in step S202*b*, a pair is generated by only feature vectors each having the effective time of 1 or more among the feature vectors stored in the memory bank unit 103*b*. This can prevent the old feature vector registered in the memory bank unit 103*b* from being used for learning.

Inference Apparatus

Figure 6A:
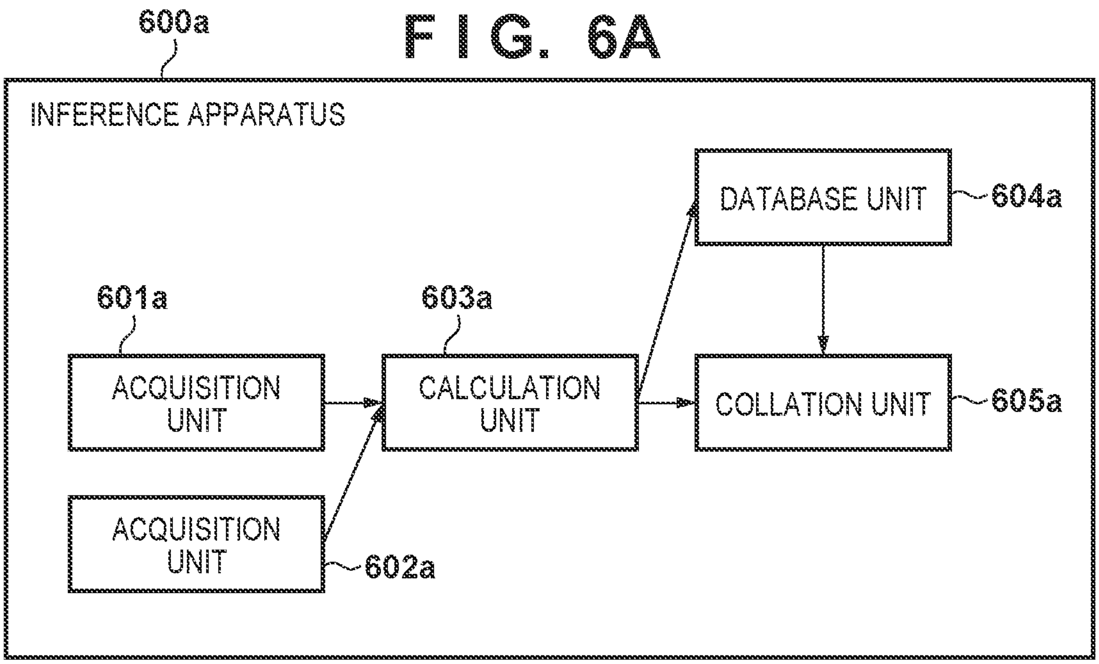
FIG. 6A is a block diagram showing an example of the functional arrangement of an inference apparatus 600*a*.

Next, an example of the functional arrangement of an inference apparatus 600*a* that determines, using the neural network learned by the learning apparatus 100*b* shown in FIG. 1B, whether faces included in two images are the face of the same person will be described with reference to a block diagram shown in FIG. 6A. First, an example of an inference apparatus that registers person images in advance and determines whether a collation image is one of the registered person images will be described.

An acquisition unit 601*a* acquires a registered image and a person label. The person label is information indicating a person. The registered image and the person label may be acquired from the external storage device 104*a*. Alternatively, a captured image transmitted from the network camera 112*a* may be acquired as a registered image and "the person label of a person included in the captured image" input by operating the input device 109*a* by the user may be acquired.

An acquisition unit 602*a* acquires a collation image. The acquisition unit 602*a* may acquire, as a collation image, an image stored in the external storage device 104*a*, or may acquire, as a collation image, a captured image transmitted from the network camera 112*a*.

Using "the neural network used by the calculation unit 102b" learned by the learning apparatus 100*b*, a calculation unit 603*a* calculates the feature vector of the registered image acquired by the acquisition unit 601*a* and the feature vector of the collation image acquired by the acquisition unit 602*a*. A database unit 604*a* holds the feature vector obtained by the calculation unit 603*a* with respect to the registered image acquired by the acquisition unit 601*a* and the corresponding person label in association with each other.

A collation unit 605*a* collates the feature vectors. More specifically, the collation unit 605*a* calculates the cos similarity between the feature vector obtained by the calculation unit 603*a* with respect to the collation image acquired by the acquisition unit 602*a* and each feature vector registered in the database unit 604*a*, and outputs each calculated cos similarity.

Note that the collation unit 605*a* may output information representing whether each obtained cos similarity exceeds a predetermined threshold. It is possible to determine that a person corresponding to the feature vector having the cos similarity to the feature vector of the collation image, that is equal to or higher than the threshold, among the feature vectors registered in the database unit 604*a*, is the same person as the person in the collation image. On the other hand, it is possible to determine that a person corresponding to the feature vector having the cos similarity to the feature vector of the collation image, that is lower than the threshold, among the feature vectors registered in the database unit 604*a*, is not the same person as the person in the collation image. Therefore, the collation unit 605*a* may perform this determination processing, and output the result of the determination processing.

The collation unit 605*a* may output the person label held in the database unit 604*a* in association with the feature vector having the cos similarity to the feature vector of the collation image, that is equal to or higher than the threshold, among the feature vectors registered in the database unit 604*a*.

In the above description, the acquisition unit 601*a* acquires the person label. However, the acquisition unit 601*a* may acquire only the registered image. In this case, the database unit 604*a* holds only the feature vector. With this arrangement, the collation unit 605*a* outputs information representing whether the registered image of the same person as the person in the collation image is registered in the database unit 604*a* without outputting the person label of collated feature vector.

Furthermore, the example of registering persons in advance has been explained above but it may be configured to collate two images of a registered image and a collation image. In this case, the database unit 604*a* is unnecessary. That is, the acquisition units 601*a* and 602*a* acquire a registered image and a collation image, respectively, and the calculation unit 603*a* obtains the feature vector of the registered image and that of the collation image. The collation unit 605*a* obtains the similarity between the feature vector of the registered image and that of the collation image, and outputs information representing whether the similarity exceeds a predetermined threshold. Alternatively, the collation unit 605*a* may be configured to output the obtained similarity.

Effect of Embodiment

As described above, according to this embodiment, since learning of pairs each having a similarity close to a threshold is concentratedly performed, it is possible to improve the accuracy of authentication when an operation is performed near the threshold. In particular, by using a loss function including "a function such that the absolute value of the gradient is large near the predetermined threshold and is non-zero but small even at a point away from the threshold", it is possible to gradually learn cases away from the threshold while concentratedly learning cases near the threshold.

Furthermore, by using different thresholds for a positive loss and a negative loss, when the authentication system is operated using the negative threshold, the possibility that the similarity of the positive pair is erroneously lower than the threshold decreases and it is possible to prevent non-authentication.

In addition, by applying a small loss to a positive pair having the similarity higher than the positive threshold, it is possible to prioritize learning of positive pairs each having the similarity the threshold close to or lower than the threshold while maintaining the similarities of the positive pairs high.

Second Embodiment

This embodiment will describe the difference from the first embodiment. This embodiment is assumed to be the same as the first embodiment, unless it is specifically stated otherwise. In the first embodiment, learning data is a pair of an image and a person label. This embodiment will describe an embodiment in a case where an attribute is used as learning data in addition to an image and a person label. In this embodiment, only pairs of a predetermined attribute combination are formed using the attribute, and the predetermined attribute combination is concentratedly learned. In addition, by increasing the gradient of a loss of a specific attribute, the loss is strengthened and learning of the specific attribute is similarly, concentratedly performed.

Formation of Pair by Person Information of Race and Like

Figure 4A:
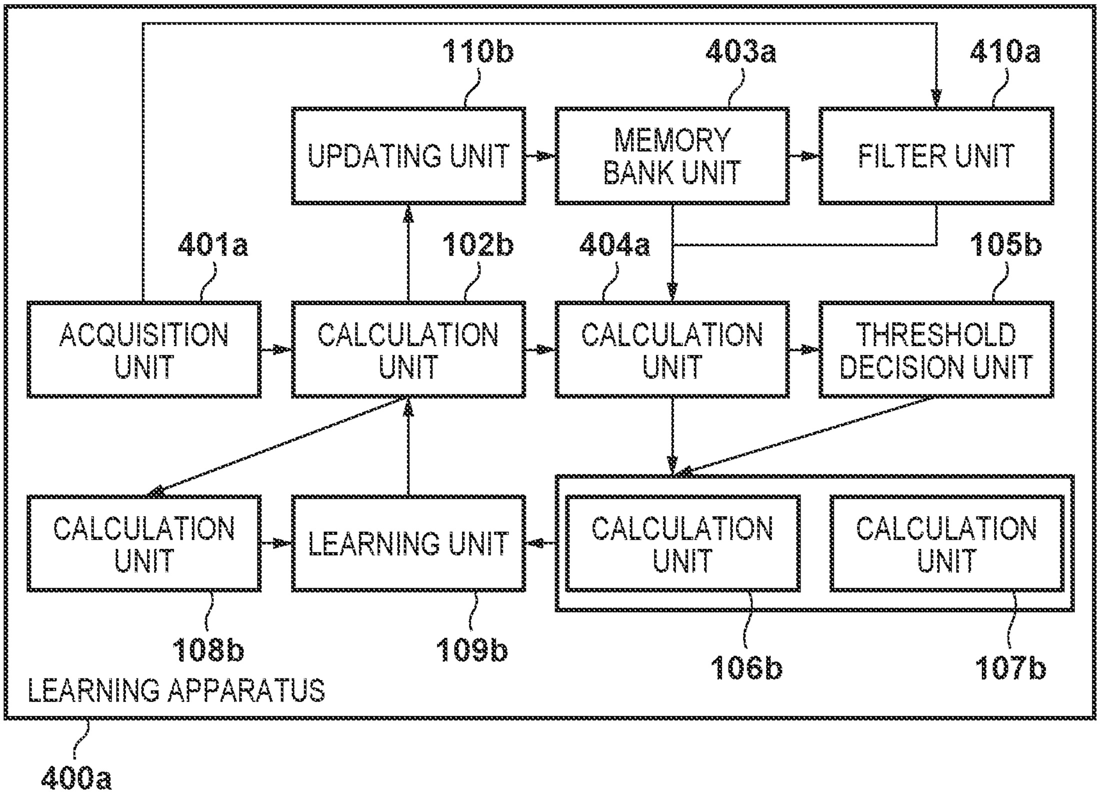
FIG. 4A is a block diagram showing an example of the functional arrangement of a learning apparatus 400*a*.

A learning apparatus that performs learning by forming a pair of the same race by using a "race" as an attribute. Since if persons are of the same race, they are similar to each other and are difficult to identify, it is possible to concentratedly learn the difficult pair. An example of the functional arrangement of a learning apparatus 400*a* according to this embodiment will be described with reference to a block diagram shown in FIG. 4A.

An acquisition unit 401*a* acquires one or more groups (learning data) of images, person labels, and attributes. One or more "groups of images, person labels, and attributes" obtained by the acquisition unit 401*a* will be referred to as a mini batch hereinafter. "A group of an image, a person label, and an attribute" will sometimes be referred to as a sample hereinafter. The attribute is metadata of an image, and holds a "race" of a face in the image in this embodiment. The race includes values of "East Asia", "South East Asia", "Caucasian", "Black", and the like. "A group of an image, a person label, and an attribute" is stored in an external storage device 104*a* or the like.

A memory bank unit 403*a* holds a feature vector in association with a person label and an attribute. The memory bank unit 403*a* holds m (the upper limit number) feature vectors for each person label where m represents a predetermined constant. Note that m feature vectors may be held for each pair of a person label and an attribute. This can hold feature vectors for each person label without the bias of the attribute. Note that at this time, when a memory bank updating unit 110*b* additionally stores a feature vector, if the number of feature vectors for each pair of the person label and the attribute exceeds m, an old feature vector is deleted to store the feature vector. The memory bank unit 403*a* holds the person label, the attribute, and the feature vector in a RAM 103*a* and the like.

A filter unit 410*a* specifies the feature vector held in the memory bank unit 403*a* based on the attribute for each image acquired by the acquisition unit 401*a*. More specifically, for each image obtained by the acquisition unit 401*a*, the filter unit 410*a* acquires the feature vector of the same attribute as that corresponding to the image from the memory bank unit 403*a*. For example, if the attribute of the image acquired by the acquisition unit 401*a* is "Caucasian", the filter unit 410*a* acquires the feature vector corresponding to the attribute "Caucasian" from the memory bank unit 403*a*.

For each image acquired by the acquisition unit 401*a*, a calculation unit 404*a* acquires the feature vector acquired by the filter unit 410*a* for the image. Then, for the acquired feature vector, the calculation unit 404*a* obtains the similarity to the feature vector of the same person label as a positive similarity, and obtains the similarity to the feature vector of a different person label as a negative similarity.

Figure 2A:
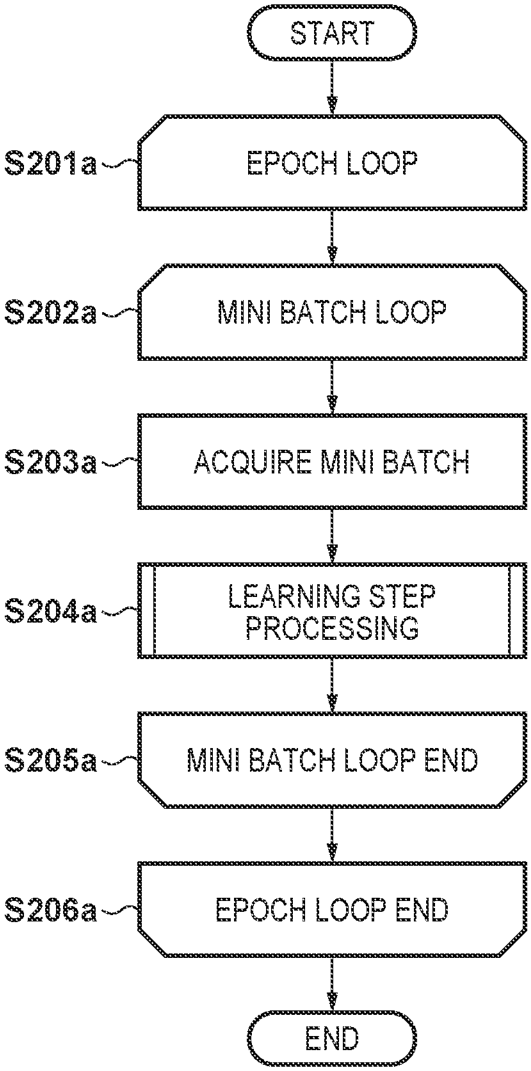
FIG. 2A is a flowchart of learning loop processing.
Figure 2B:
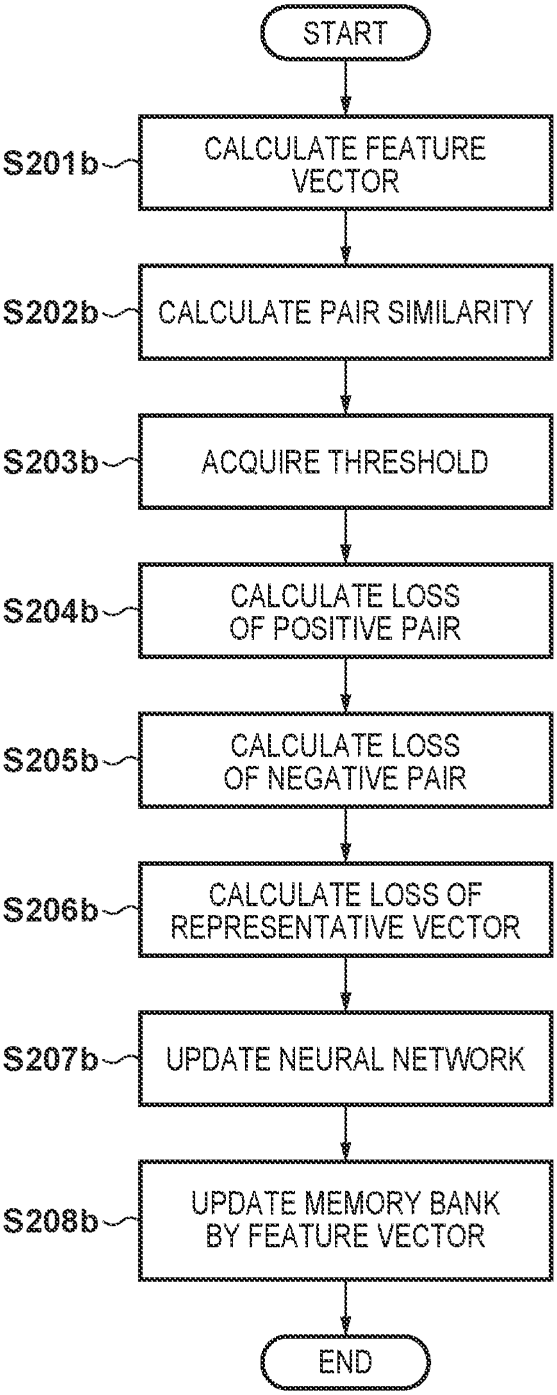
FIG. 2B is a flowchart illustrating details of processing in step S204*a*.
Figure 4B:
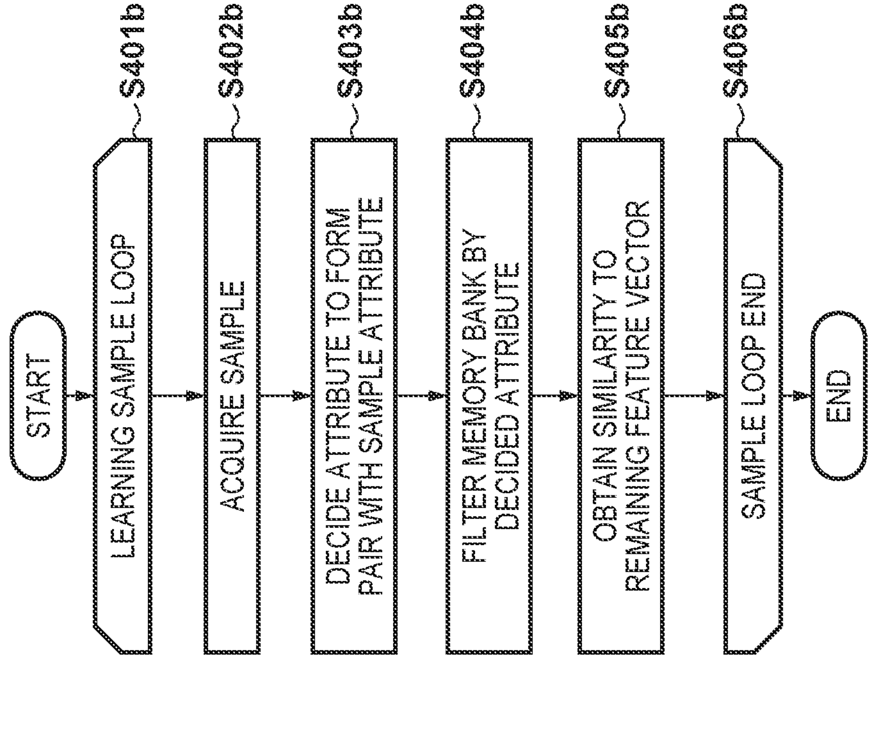
FIG. 4B is a flowchart illustrating details of processing in step S202*b*.

In this embodiment as well, similar to the first embodiment, processing according to the flowchart shown in FIG. 2B is performed in step S204*a*. However, this embodiment is different from the first embodiment that processing according to a flowchart shown in FIG. 4B is performed in step S202*b*. Details of the processing in step S202*b* according to this embodiment will be described with reference to the flowchart shown in FIG. 4B.

Step S401*b* is the start of a loop of a learning sample. Each sample of the mini batch is assigned with a number from 1. To refer to the number using a variable k, a CPU 101*a* first initializes the value of the variable k to 1. If the value of the variable k is equal to or smaller than the number of samples, the process advances to step S402*b*. If the value of the variable k exceeds the number of samples, the process exits from the loop, and ends.

In step S402*b*, the acquisition unit 401*a* acquires the kth sample of the mini batch. In step S403*b*, the filter unit 410*a* specifies an attribute to form a pair with the attribute of the sample acquired in step S402*b*. More specifically, the filter unit 410*a* specifies the attribute of the sample. That is, the filter unit 410*a* specifies "Caucasian" in a case where the attribute of the sample is "Caucasian".

In step S404*b*, the filter unit 410*a* acquires, from the memory bank unit 403*a*, the feature vector corresponding to the attribute acquired in step S403*b*. For example, if "Caucasian" is specified in step S403*b*, the filter unit 410*a* acquires the feature vector corresponding to "Caucasian" from the memory bank unit 403*a*.

In step S405*b*, the calculation unit 404*a* obtains the positive pair similarity and the negative pair similarity using the feature vector of the sample and the feature vector acquired in step S404*b*. More specifically, the calculation unit 404*a* obtains the positive pair similarity from the similarity between the feature vector of the person label of the sample and that of the same person label. Furthermore, the calculation unit 404*a* obtains the negative pair similarity from the similarity between the feature vector of the person label of the sample and that of a different person label. Step S406*b* is the end of the loop of the sample, in which the CPU 101*a* adds 1 to the variable k, and the process returns to step S401*b*.

In the above description, only "race" is used as person information. However, another attribute of "sex", "age", or the like may be used. Furthermore, "birthplace" may be used instead of "race". Note that a combination of these attributes may be used as an attribute. That is, if the race and the sex are used, only a pair of the same race and sex is formed. Furthermore, with respect to the age or the like, category values obtained by dividing the age into 10-year periods may be used. The person information is not limited to them.

In the above-description, a pair of the same attribute of the person information is formed. However, a pair of similar pieces of person information may be formed. For example, in a case where the attribute of the race includes "East Asia", "South East Asia", "Caucasian", and "Black", "East Asia" and "South East Asia" are similar races, and thus a pair of "East Asia" and "South East Asia" may be formed. Furthermore, in the case of the age or the like, a pair may be formed by considering the ages within a predetermined range of ±5 years or the like as similar ages. In addition, since young people largely vary with ages, the similarity determination range may be changed to a range of ±3 years or the like under the age of 20. More specifically, the filter unit 410*a* is configured to acquire the feature vector similar to the attribute of the sample from the memory bank unit 403*a*. At this time, the filter unit 410*a* is configured to obtain all similar attributes in step S403*b* of FIG. 4B, and obtain the feature vector matching one of the attributes from the memory bank unit 403*a* in step S404*b*. However, in a case where continuous values such as ages are used, the filter unit 410*a* may be configured to obtain all ages in step S403*b* but may be configured to generate a conditional expression of a range in step S403*b,* and leave the feature vector satisfying the conditional expression in step S404*b*. In this way, the filter may be not only matching of the value but also a complicated conditional expression of a range or the like.

In the above description, the filter unit 410*a* supplies the feature vector to the calculation unit 404*a*. However, the filter unit 410*a* may supply, to the calculation unit 404*a,* "identifier information for specifying a feature vector meeting the condition". Then, the calculation unit 404*a* may select a pair similarity based on the identifier information. That is, the calculation unit 404*a* may calculate the similarity for each of all the pairs, and then acquire, using the identifier information, the pair similarity to be used. This arrangement has the merit that a pair selection method based on the similarity can be used at the same time. That is, a negative pair indicating the similarity higher than the predetermined similarity or a positive pair indicating the similarity lower than the predetermined similarity can be a difficult pair. If such difficult pair is also selected, it is possible to concentratedly learn the difficult pair. In a case where such selection method is used at the same time, it is more efficient to select the pair of the same attribute after obtaining the similarities of all the pairs. A method of transmitting the feature vector specified by the filter unit 410*a* is not limited to them.

Strengthening of Loss by Attribute

Figure 4C:
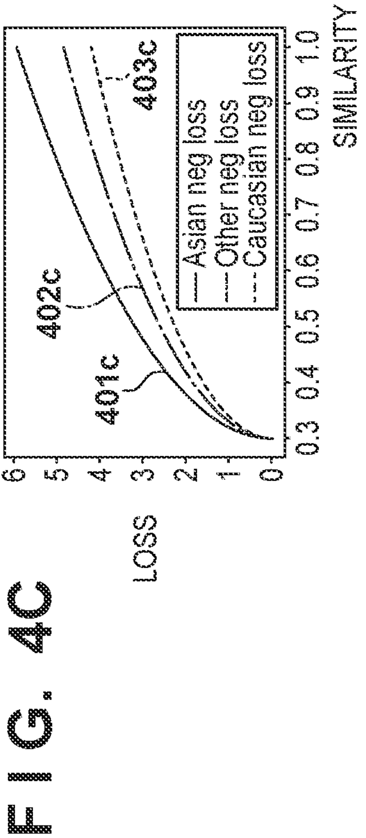
FIG. 4C is a graph of a loss when r of equation (3) is changed in accordance with a race.
Figure 4D:
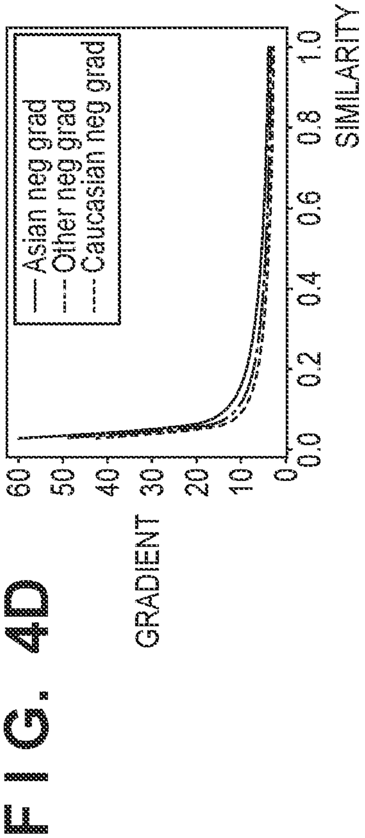
FIG. 4D is a graph of the gradient of each loss.

A method of concentratedly learning a specific attribute by strengthening the loss of the specific attribute will be described next. Even in a case where learning is performed by focusing on the same attribute, a weak point/strong point occurs for each value of the attribute. For example, the similarity of the negative pair is relatively high for the weak attribute. By changing r of equation (3) above in accordance with the attribute, the loss is strengthened/weakened in accordance with the attribute. FIG. 4C is a graph of each loss when changing r of equation (3) in accordance with the race. In this example, assume that "Asian" is a weak point and "Caucasian" is a strong point. Reference numeral 401*c* denotes the loss of "Asian"; 403*c,* the loss of "Caucasian"; and 402*c,* the loss of another race. The loss of "Asian" as a weak point is larger even for the same similarity. r of equation (3) is made small for "Asian" of the weak attribute and is made large for "Caucasian" of the strong attribute. In this way, it is possible to change the strength of the loss in accordance with the attribute by changing r in accordance with the attribute. FIG. 4D is a graph of the gradient of each loss. The gradient for "Asian" of the weak attribute is larger than that for other attributes, and learning is performed more strongly. It is found that the magnitude of the gradient can be changed by changing r in accordance with the attribute.

Note that r is changed, as described above, in accordance with the attribute of the sample acquired by the acquisition unit 401*a*. However, if the attributes of the pair are applicable, corresponding r may be used. Alternatively, if one of the attributes of the pair is applicable, corresponding r may be used. The case of the negative loss has been exemplified above but the same may apply to the case of the positive loss of equation (1).

Formation of Pair by Image Quality Based on Mask and Like

Figure 5A:
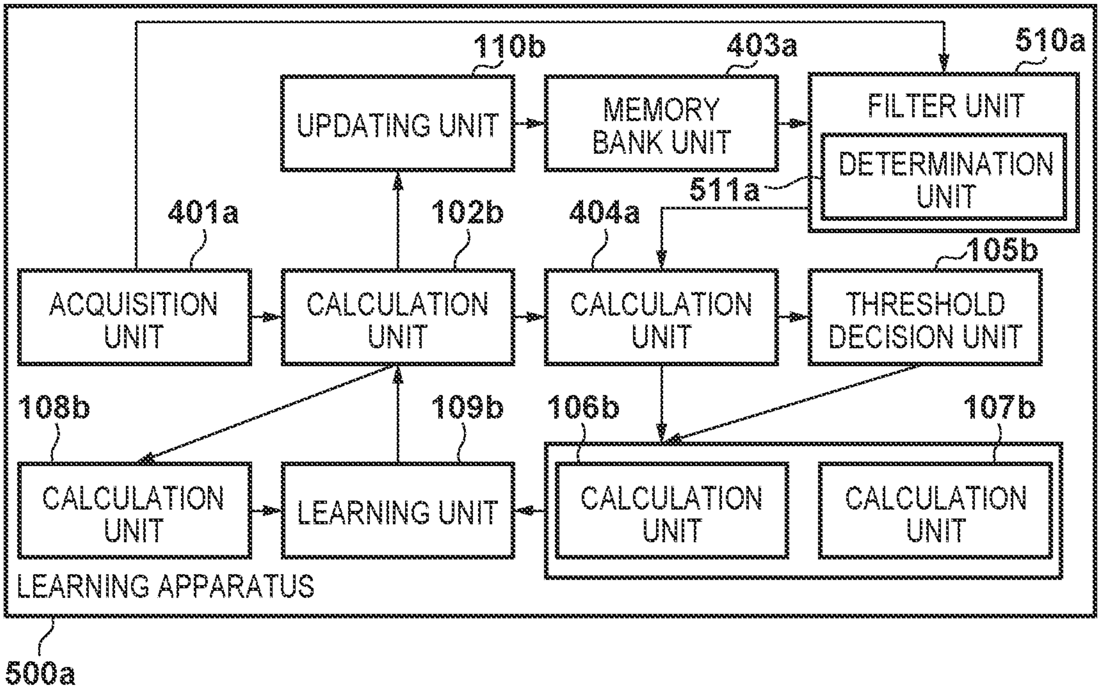
FIG. 5A is a block diagram showing an example of the functional arrangement of a learning apparatus 500*a*.

Next, an example of the functional arrangement of a learning apparatus 500*a* that performs learning by forming a pair so that one image of the pair includes a mask by assuming "presence/absence of mask" as an attribute will be described with reference to a block diagram shown in FIG. 5A.

When a face authentication system for determining whether persons included in two images are identical to each other is operated, one image is a registered image and thus does not include a mask. Therefore, only a pair of "absence of mask and presence of mask" and a pair of "absence of mask and absence of mask" are evaluated at the time of the operation, and a pair of "presence of mask and presence of mask" is not evaluated in many cases. Thus, such pair that only one image is an image of "presence of mask" is formed to perform learning. Note that in FIG. 5A, the same reference numerals as in FIG. 4A denote the same function units and a description thereof will be omitted.

A filter unit 510*a* includes a determination unit 511*a*. The determination unit 511*a* determines the quality of an image acquired by the acquisition unit 401*a* based on the attribute of the image. For example, the determination unit 511*a* determines "high quality" in a case where the attribute of the image is "absence of mask", and determines "low quality" in a case where the attribute of the image is "presence of mask". If the image acquired by the acquisition unit 401*a* is an image of "low quality", the filter unit 510*a* acquires, from the memory bank unit 403*a,* a feature vector for which "high quality" is determined. On the other hand, if the image acquired by the acquisition unit 401*a* is an image of "high quality", the filter unit 510*a* acquires feature vectors of "low quality" and "high quality" from the memory bank unit 403*a*.

In this embodiment as well, similar to the first embodiment, the processing according to the flowchart shown in FIG. 2A is performed. However, this embodiment is different from the first embodiment that processing according to a flowchart shown in FIG. 5B is performed in step S204*a*. Details of the processing in step S204*a* according to this embodiment will be described with reference to the flowchart shown in FIG. 5B. Note that in FIG. 5B, the same step numbers as in FIG. 4B denote the same processing steps and a description thereof will be omitted.

In step S503*b*, the determination unit 511*a* determines the quality based on the attribute of the sample acquired in step S402*b*. More specifically, the determination unit 511*a* determines "low quality" in a case where the attribute of the sample is "presence of mask", and determines "high quality" in a case where the attribute of the sample is "absence of mask".

In step S504*b*, the filter unit 510*a* obtains the quality to form a pair with the quality determined in step S503*b*. More specifically, the filter unit 510*a* obtains "high quality" in a case where "low quality" is determined for the sample in step S503*b*, and obtains both "low quality" and "high quality" in a case where "high quality" is determined for the sample in step S503*b*.

In step S505*b*, the filter unit 510*a* acquires, from the memory bank unit 403*a*, the feature vector of the corresponding quality obtained in step S504*b*. More specifically, the filter unit 510*a* causes the determination unit 511*a* to determine the quality based on the attribute of the feature vector in the memory bank unit 403*a*, and acquires the feature vector of the corresponding quality obtained in step S504*b*. Note that the quality determination result of the memory bank unit 403*a* may be cached, and used. The example of using "mask" as an attribute has been explained above. However, the quality may be determined in accordance with each attribute shown in FIG. 5C.

A shielding attribute is an attribute concerning shielding of the face of a person included in an image. In addition to the presence/absence of a mask, the presence/absence of "sunglasses" or "hat" can be used. Furthermore, with respect to "make-up", normal make-up is OK but low quality may be determined in a case of an "abnormality" such as paint on a face when, for example, watching a soccer match. It is also considered that part of the face is shielded by another item or a hand. In this case, the quality may be decided in accordance with the ratio of a shielded area.

A reflection attribute is an attribute concerning how a person included in an image is taken. "Face size" indicates the length of a short side of a rectangular region of a face, and the quality is determined in accordance with whether the length is longer than a predetermined size such as 100 pixels. "Interpupillary distance" indicates the number of pixels between both eyes, and the quality is determined in accordance with whether the interpupillary distance is larger than a predetermined number of pixels. "Eye closing" is an attribute indicating whether eyes are closed, and high quality is determined when eyes are open. "Facial expression" indicates the facial expression of the person, and high quality is determined for a facial expression close to a straight face. On the other hand, low quality may be determined for an abnormality such as a mouth opened excessively wide or a smile. "Face direction" indicates the direction of the face. If the pitch, roll, and yaw rotation angles are equal to or smaller than a predetermined threshold (±5°), high quality is determined; otherwise, low quality is determined.

An image quality attribute is an attribute concerning the image quality. "Brightness" indicates the brightness of the reflection of the face, and brightness is determined by performing threshold processing (determination processing of comparing a value with the threshold) for a numerical value such as a luminance "Image capturing device" indicates information concerning a device that has captured the image. If the device is a predetermined camera, high quality may be determined; otherwise, low quality may be determined. In this example, if a single-lens reflex camera is used to capture the image, high quality is determined; otherwise, low quality is determined. "Noise" indicates blurring/shaking or the like, and if "noise" is equal to or larger than a predetermined amount, low quality is determined. Alternatively, the determination processing may be performed by additionally considering another noise such as salt-and-pepper noise. The attribute for determining the quality is not limited to them. The image quality attribute may further include a resolution.

Furthermore, not all these items need to be used, and these items may selectively be used in combination. As a combining method, a method of combining the items as an AND condition may be possible. For example, only when only two items of "mask" and "sunglasses" are used, and high quality is determined for both "mask" and "sunglasses", "high quality" may be determined. If "low quality" is determined for one of "mask" and "sunglasses", "low quality" may be determined. However, if many conditions are used as an AND condition, the number of images for which high quality is determined excessively decreases, and the number of pairs usable for learning decreases. To cope with this, feature vectors to be left may be determined for each attribute and may be left under the OR conditions. That is, the feature vectors to be left are obtained from the memory bank unit 403*a* in accordance with the presence/absence of "mask". Next, the feature vectors to be left are obtained from the memory bank unit 403*a* in accordance with the presence/absence of "sunglasses". The feature vectors determined to be left under one of the conditions may be left to form pairs. Alternatively, a plurality of attributes are processed as AND conditions to form some pairs of attributes, and the feature vectors to be left may be left under the OR condition. For example, "mask" and "sunglasses" are used as one AND condition, and "interpupillary distance" and "brightness" are used as one AND condition. Then, the feature vectors to be left are obtained under the two AND conditions, and the results are combined under an OR condition, thereby deciding the feature vectors to be left. The method of combining the attributes is not limited to them.

In the above description, pairs are formed by excluding a pair of "low quality and low quality". However, pairs may be formed by excluding a pair of "high quality and high quality". More specifically, if the image acquired by the acquisition unit 401*a* is an image of "high quality", only the feature vectors of "low quality" are acquired from the memory bank unit 403*a*. Since a pair of "high quality and high quality" is easy to collate, learning can be performed by focusing on pairs of "low quality and high quality" that are difficult to collate. This can improve the accuracy of the difficult pairs.

Furthermore, the acquisition unit 401*a* also holds the attribute in the external storage device 104*a* in the above description, but may be configured to obtain the attribute from an image using an attribute determiner. For example, a neural network for estimating the presence/absence of a mask for an image is prepared for the attribute of the presence/absence of a mask, and a result estimated by the neural network is used. Alternatively, for the attribute of brightness, the luminance value of an image or the like is calculated. The arrangement of an attribute estimator is not limited to them.

Furthermore, the quality is estimated based on the attribute in the above description. However, the quality may be estimated directly from an image. That is, a neural network may be learned to output the quality when an image is input, and the output from the neural network may be obtained as an quality attribute. It is possible to calculate a quality score or the like for an image by a neural network that classifies a data set of high-quality images and low-quality images. The quality score can be held as an attribute. In this case, the determination unit 511*a* holds a threshold for the quality score. If the quality score exceeds the threshold, the determination unit 511*a* determines high quality; otherwise, the determination unit 511*a* determines low quality. The attribute may include quality, and the method of obtaining the quality from the image is not limited to them.

Inference Apparatus

Figure 6B:
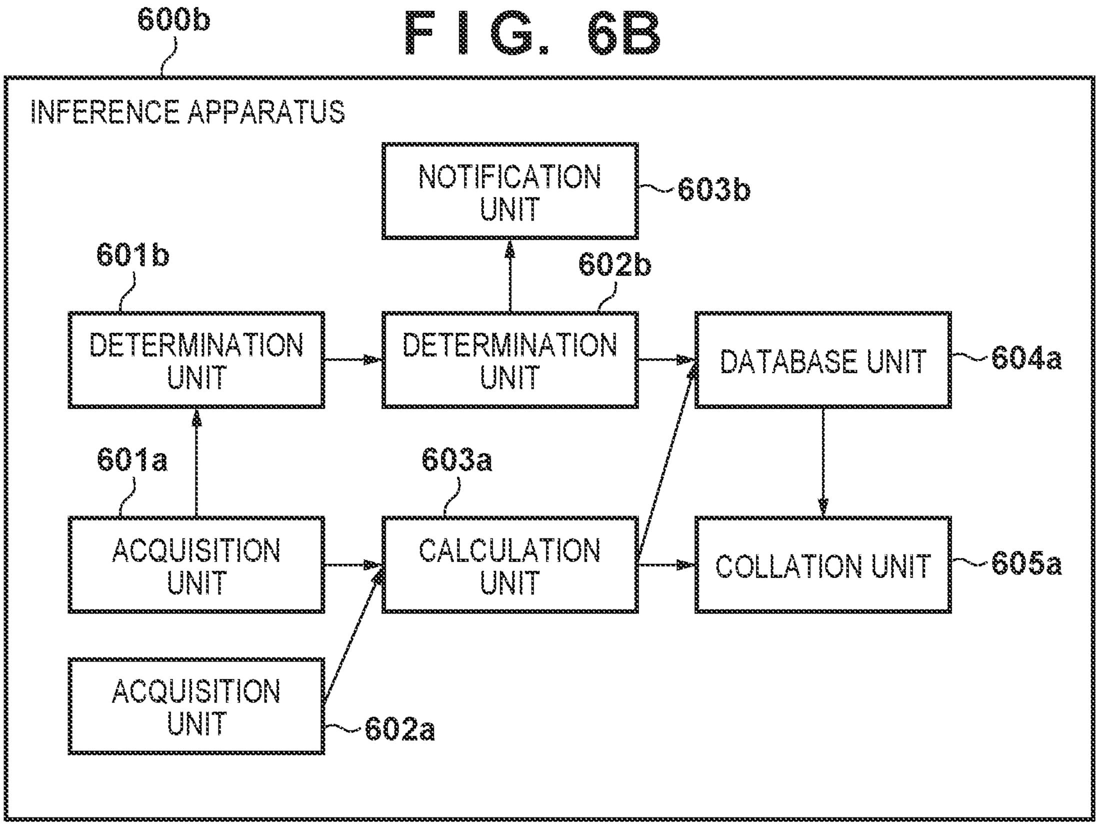
FIG. 6B is a block diagram showing an example of the functional arrangement of an inference apparatus 600*b*.

An example of the functional arrangement of an inference apparatus 600*b* that determines, using a neural network learned by the learning apparatus according to this embodiment, whether faces included in two images are the face of the same person will be described next with reference to FIG. 6B. Basically, the inference apparatus 600*b* can be configured similar to the inference apparatus having the functional arrangement example shown in FIG. 6A. An inference apparatus that does not form a pair which has not been learned, by using, at the time of inference, the same quality determination processing as that of the determination unit 511*a* which is used in "Formation of Pair by Image Quality Based on Mask and Like", will be described. In FIG. 6B, the same reference numerals as in FIG. 6A denote the same function units and a description thereof will be omitted.

A determination unit 601*b* obtains the attribute of an image acquired by an acquisition unit 601*a*. More specifically, the determination unit 601*b* may be configured to obtain the attribute of the image from the image using an attribute determiner or the like. For example, the attribute determiner estimates the presence/absence of a mask in the image. Alternatively, the determination unit 601*b* may be configured to hold, in advance, the attribute of the image in the external storage device 104*a*, and acquire it. The method of obtaining the attribute of the image by the determination unit 601*b* is not limited to them.

A determination unit 602*b* determines the quality of the image by the same criterion as that of the determination unit 511*a* used by the above-described learning apparatus. More specifically, the determination unit 602*b* performs the same processing as that of the determination unit 511*a*. For example, if it is configured to determine the quality based on the presence/absence of a mask, low quality is determined for the presence of the mask, and high quality is determined for the absence of the mask.

Alternatively, the determination unit 602*b* may use a stricter criterion than that of the determination unit 511*a*. For example, the criterion for a numerical value range may be set stricter. That is, the determination unit 511*a* determines high quality when "interpupillary distance" indicates 50 pixels or more but the determination unit 602*b* determines high quality when "interpupillary distance" indicates a value equal to or larger than a numerical value (for example, 70 pixels) larger than 50 pixels. Alternatively, attributes used may be increased to make the criterion stricter. That is, the determination unit 602*b* may use attributes that are not used by the determination unit 511*a*, and determine "high quality" when high quality is determined for all the attributes. This can hold higher-quality images in a database unit 604*a*, thereby improving accuracy of collation.

When the determination unit 602*b* determines low quality, a notification unit 603*b* makes a notification of the result of the determination processing. More specifically, the notification unit 603*b* displays, on a monitor 110*a* or the like, information representing that registration has failed because the registered image is a low-quality image. At this time, the feature vector of the image acquired by the acquisition unit 601*a* is not registered in the database unit 604*a*.

Note that the database unit 604*a* is a constituent element in the above description but is not essential. In a case where there is no database unit 604*a*, a collation unit 605*a* obtains the similarity between the feature vectors of images obtained by the acquisition unit 601*a* and an acquisition unit 602*a*. However, if the determination unit 602*b* determines low quality, the collation unit 605*a* need not calculate the similarity. Alternatively, the processing need not be performed from calculation of the feature vector of the image by a calculation unit 603*a*.

Effect of Embodiment

As described above, according to this embodiment, in the example shown in "Formation of Pair by Person Information of Race and Like", it is possible to concentratedly learn difficult pairs with respect to pairs of similar pieces of person information, thereby improving accuracy. In the example shown in "Strengthening of Loss by Attribute", it is possible to concentratedly perform learning of a weak attribute, thereby reducing the variation of accuracy caused by the attribute. In the example shown in "Formation of Pair by Image Quality Based on Mask and Like", it is possible to concentratedly learn pairs appearing at the time of the operation of the face authentication system, thereby improving accuracy at the time of the operation. In addition, when the inference apparatus checks the quality of the registered image by the criterion equal to or stricter than the image quality used at the time of learning, collation of a pair that has not been learned is avoided, thereby making it possible to prevent erroneous authentication/non-authentication.

Third Embodiment

The learning apparatus and the inference apparatus according to the above embodiments process a face authentication task as a target but may be applied to an authentication task that applies another distance learning. For example, the learning apparatus and the inference apparatus can be applied to another biometric authentication in which, for example, it is determined, based on images of pupils such as irises, whether images of two pupils are of the same person. The type of authentication task processed by the learning apparatus and the inference apparatus is not limited to them.

Numerical values, processing timings, processing orders, main constituents of processing, acquisition methods/transmission destinations/transmission sources/storage locations of data (information) used in the above-described embodiments are merely examples for a detailed explanation. The present invention is not intended to limit these to the examples.

Some or all of the above-described embodiments may be used in combinations as needed. Alternatively, some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-175029, filed Oct. 31, 2022, which is hereby incorporated by reference herein in its entirety.

What is claimed is:

1. A learning apparatus comprising:

one or more processors; and one or more memories storing executable instructions which, when executed by the one or more processors, cause the learning apparatus to function as:

a first acquisition unit configured to acquire at least one pair of an image and a label;

a first calculation unit configured to calculate a feature vector from the image using a feature extractor;

a second calculation unit configured to calculate, as a positive pair similarity, a similarity between a first feature vector calculated by the first calculation unit from the image acquired by the first acquisition unit and a second feature vector associated with the same label as the label acquired by the first acquisition unit, and calculate, as a negative pair similarity, a similarity between the first feature vector calculated by the first calculation unit from the image acquired by the first acquisition unit and a third feature vector associated with a label different from the label acquired by the first acquisition unit;

a decision unit configured to decide a similarity threshold;

a third calculation unit configured to calculate a loss value with respect to the positive pair similarity lower than the threshold;

a fourth calculation unit configured to calculate a loss value with respect to the negative pair similarity higher than the threshold; and a learning unit configured to learn a parameter of the feature extractor that decreases the loss value calculated by the third calculation unit and the loss value calculated by the fourth calculation unit, wherein one of the third calculation unit and the fourth calculation unit uses a loss function including a function such that an absolute value of a gradient is larger near a predetermined threshold and is non-zero but smaller even at a point away from the threshold.

2. The apparatus according to claim 1, wherein the decision unit acquires a first threshold and a second threshold, the third calculation unit calculates a loss value with respect to the positive pair similarity lower than the first threshold, and the fourth calculation unit calculates a loss value with respect to the negative pair similarity higher than the second threshold.

3. The apparatus according to claim 2, wherein with respect to the positive pair similarity higher than the first threshold, the third calculation unit calculates a loss value smaller than the loss value for the positive pair similarity lower than the first threshold.

4. The apparatus according to claim 1, wherein the loss function uses, in a predetermined domain, the function such that the absolute value of the gradient is larger near the predetermined threshold and is non-zero but smaller even at a point away from the threshold.

5. The apparatus according to claim 1, wherein the loss function uses, for a term of a polynomial, the function such that the absolute value of the gradient is larger near the predetermined threshold and is non-zero but smaller even at a point away from the threshold.

6. The apparatus according to claim 1, wherein the loss function is a function such that a derivative of a loss function has a negative exponent.

7. The apparatus according to claim 1, wherein the first acquisition unit acquires images of at least one positive pair or images of at least one negative pair, and the second calculation unit obtains a similarity between feature vectors of the images of the positive pair as a positive pair similarity, and obtains a similarity between feature vectors of the images of the negative pair as a negative pair similarity.

8. The apparatus according to claim 1, wherein the one or more processors are further programmed to cause the learning apparatus to function as a memory bank unit configured to hold a feature vector in association with the label, and an updating unit configured to update the feature vector in the memory bank unit by the feature vector of the image acquired by the first acquisition unit, and the second calculation unit obtains, as a positive similarity, a similarity with a feature vector of the same label as that of the feature vector calculated by the first calculation unit from the image acquired by the first acquisition unit, among the feature vectors held in the memory bank unit, and obtains, as a negative similarity, a similarity with a feature vector of a label different from that of the calculated feature vector.

9. The apparatus according to claim 8, wherein the memory bank unit holds an upper limit number of feature vectors held for each label, and in a case where the number of feature vectors of the label held in the memory bank unit exceeds the upper limit number, the updating unit deletes an oldest feature vector, and holds a new feature vector.

10. An inference apparatus comprising:

one or more processors; and one or more memories storing executable instructions which, when executed by the one or more processors, cause the inference apparatus to function as:

an extraction unit configured to extract a feature vector from each of a registered image and a collation image using a feature extractor learned by a learning apparatus defined in claim 1; and a collation unit configured to determine, based on a similarity between the feature vector of the registered image extracted by the extraction unit and the feature vector of the collation image extracted by the extraction unit, whether the registered image and the collation image include the same person.

11. A learning method performed by a learning apparatus, comprising:

acquiring at least one pair of an image and a label;

calculating a feature vector from the image using a feature extractor;

calculating, as a positive pair similarity, a similarity between a first feature vector calculated from the acquired image and a second feature vector associated with the same label as the acquired label, and calculating, as a negative pair similarity, a similarity between the first feature vector and a third feature vector associated with a label different from the label;

deciding a similarity threshold;

calculating a first loss value with respect to the positive pair similarity lower than the threshold;

calculating a second loss value with respect to the negative pair similarity higher than the threshold; and learning a parameter of the feature extractor that decreases the first loss value and the second loss value, wherein in one of the calculating the first loss value and the calculating the second loss value, a loss function including a function such that an absolute value of a gradient is larger near a predetermined threshold and is non-zero but smaller even at a point away from the threshold is used.

12. An inference method performed by an inference apparatus, comprising:

acquiring a registered image;

acquiring a collation image;

calculating a feature vector from an image using a feature extractor learned by a learning method defined in claim 11; and determining, based on a similarity between a feature vector of the registered image and a feature vector of the collation image, whether the registered image and the collation image include the same person.

13. A non-transitory computer-readable storage medium storing a computer program for causing a computer to execute each step of a learning method defined in claim 11.

14. A non-transitory computer-readable storage medium storing a computer program for causing a computer to execute each step of an inference method defined in claim 12.

* * * * *